US010582077B2

(12) United States Patent
Suzuki

(10) Patent No.: US 10,582,077 B2
(45) Date of Patent: Mar. 3, 2020

(54) READING APPARATUS, DETERMINATION METHOD, AND STORAGE MEDIUM STORING PROGRAM

(71) Applicant: CANON FINETECH NISCA INC., Misato-shi, Saitama (JP)

(72) Inventor: Wataru Suzuki, Yokohama (JP)

(73) Assignee: CANON FINETECH NISCA, INC., Misato-Shi, Saitama (JP)

(*) Notice: Subject to any disclaimer, the term of this patent is extended or adjusted under 35 U.S.C. 154(b) by 30 days.

(21) Appl. No.: 15/797,166

(22) Filed: Oct. 30, 2017

(65) Prior Publication Data

US 2018/0131828 A1 May 10, 2018

(30) Foreign Application Priority Data

Nov. 7, 2016 (JP) ................................ 2016-217442
Nov. 7, 2016 (JP) ................................ 2016-217444

(51) Int. Cl.
*H04N 1/04* (2006.01)
*H04N 1/00* (2006.01)

(52) U.S. Cl.
CPC ..... *H04N 1/00753* (2013.01); *H04N 1/00708* (2013.01); *H04N 1/00745* (2013.01); *H04N 2201/0094* (2013.01)

(58) Field of Classification Search
CPC .......... H04N 1/00753; H04N 1/00708; H04N 1/00745; H04N 2201/0094
USPC ...................................... 358/475, 509, 488
See application file for complete search history.

(56) References Cited

U.S. PATENT DOCUMENTS

| | | | | |
|---|---|---|---|---|
| 4,929,844 A * | 5/1990 | Houjiyou | ........... | H04N 1/00681 250/559.07 |
| 5,189,528 A * | 2/1993 | Takashima | ........... | H04N 1/4076 348/E5.081 |
| 7,864,378 B2 * | 1/2011 | Shimizu | ............. | H04N 1/00681 358/474 |
| 2001/0035987 A1 * | 11/2001 | Ishido | ................ | H04N 1/00681 358/475 |
| 2004/0233478 A1 * | 11/2004 | Ishido | ................ | H04N 1/00681 358/449 |
| 2005/0029352 A1 * | 2/2005 | Spears | ............... | H04N 1/00835 235/454 |
| 2009/0122357 A1 * | 5/2009 | Ishido | ................ | H04N 1/00551 358/449 |
| 2009/0237751 A1 * | 9/2009 | Ishido | ................ | H04N 1/00681 358/483 |
| 2010/0067065 A1 * | 3/2010 | Ishido | ................ | H04N 1/00681 358/449 |
| 2014/0022605 A1 * | 1/2014 | Shimizu | ............. | H04N 1/00896 358/449 |

(Continued)

FOREIGN PATENT DOCUMENTS

JP H09-135330 5/1997
JP 2016-019262 2/2016

*Primary Examiner* — Cheukfan Lee
(74) *Attorney, Agent, or Firm* — Venable LLP

(57) ABSTRACT

Based on a light-reception result of a light-receiving unit capable of receiving light on a document table and outputting the light-reception result, the end of a document placed on a document table is determined. In accordance with the condition of external light on the document table, the light-receiving unit is controlled so as to change a method of outputting the light-reception result from the light-receiving unit.

20 Claims, 19 Drawing Sheets

(56) References Cited

U.S. PATENT DOCUMENTS

2014/0293370 A1* 10/2014 Loi .................... H04N 1/00758
   358/475
2016/0134769 A1* 5/2016 Yamamoto ......... H04N 1/00554
   358/449

* cited by examiner

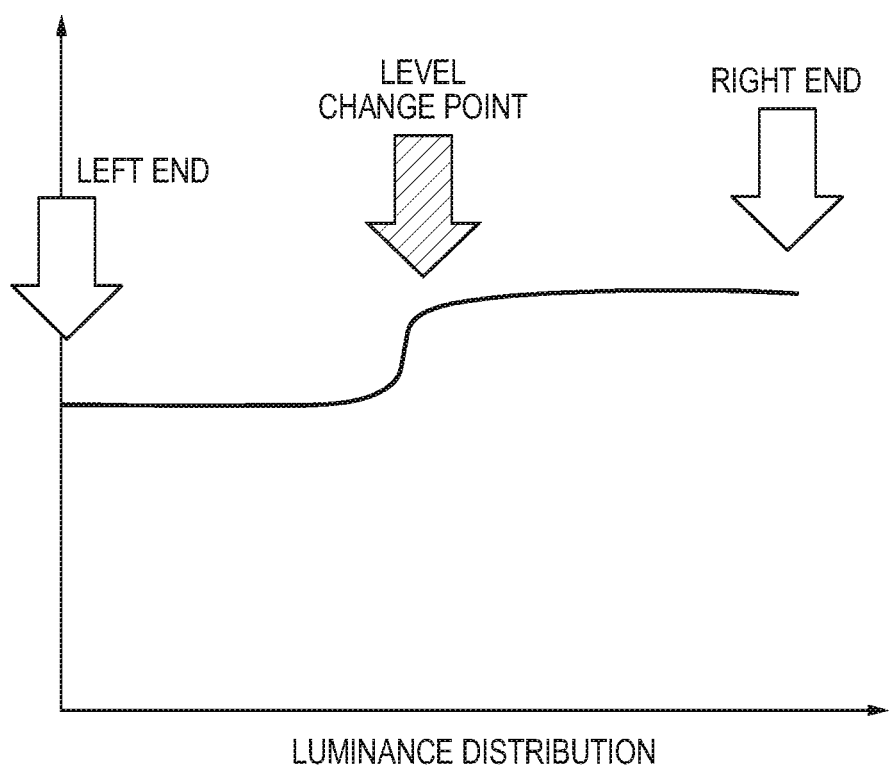

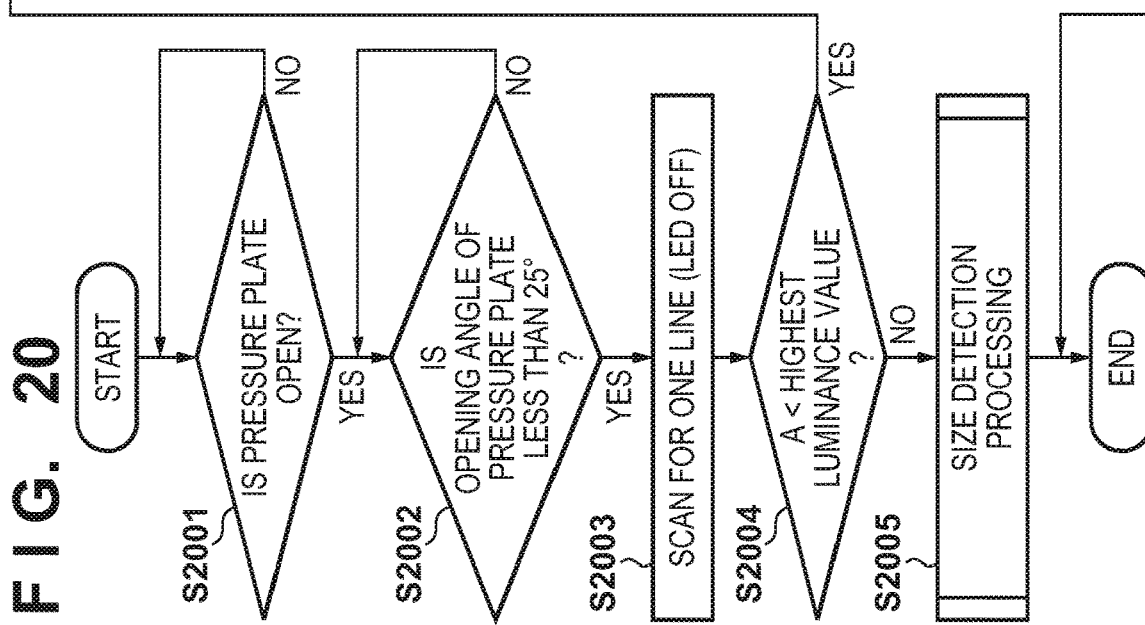

READING APPARATUS, DETERMINATION METHOD, AND STORAGE MEDIUM STORING PROGRAM

BACKGROUND OF THE INVENTION

Field of the Invention

The present invention relates to a reading apparatus that reads a document, a determination method, and a storage medium that stores programs.

Description of the Related Art

In an image reading apparatus, size detection processing by external light for detecting the size of a document placed on a document table glass by the external light may be performed (Japanese Patent Laid-Open No. 2016-19262). In the size detection processing by the external light, image data of the document placed on the document table glass in a main scanning direction is obtained in a state in which an openable/closable document pressure plate that presses the document on the document table glass plate is open. At this time, the image data is obtained in a state in which a light source such as an LED is OFF, and external light is applied. Accordingly, a region where the document is placed is dark, and a region where the document is not placed is bright because of the external light, making it possible to detect a document end by their changes in luminance level. The size of the document in the main scanning direction is judged from the detected document end.

Because the document is scanned in the state in which the document pressure plate is open in the above-described document size detection processing, the size may be detected erroneously due to the influence of the external light. In order to remove the influence of such external light, Japanese Patent Laid-Open No. 9-135330 describes a technique of detecting the amount of external light when a document pressure plate is open and removing the amount of the external light at the time of reading.

However, because a luminance value in an entire main scanning direction is influenced by the condition of the external light, the position of the document end may be detected erroneously when a fixed luminance threshold is used for a read luminance value in detecting the document end. Even with the arrangement of Japanese Patent Laid-Open No. 9-135330, for example, when a document on a document table glass is irradiated with strong external light such as the westering sun, the light is transmitted through the document and reaches an image reading sensor. In this case, all luminance values in the main scanning direction become high uniformly, and a luminance change is not obtained in the document end, making it impossible to detect the document end appropriately.

SUMMARY OF THE INVENTION

An aspect of the present invention is to eliminate the above-mentioned problems with the conventional technology. The present invention provides a reading apparatus that detects the position of a document end appropriately even if it receives the influence of external light, a determination method, and a storage medium that stores programs.

The present invention in one aspect provides a reading apparatus according to the present invention a reading apparatus comprising: a light-receiving unit configured to receive light on a document table and output an output signal based on a light-reception result; a change unit configured to change the output signal; an irradiation unit configured to irradiate the document table with light; and a determination unit configured to determine an end of a document placed on the document table, wherein the determination unit can make the change unit change the output signal based on the output signal in a state in which the irradiation unit does not irradiate the document table with light, and if the change unit changes the output signal, the determination unit determines the end of the document based on the changed output signal.

According to the present invention, it is possible to detect the position of a document end appropriately even if the influence of external light is received.

Further features of the present invention will become apparent from the following description of exemplary embodiments with reference to the attached drawings.

BRIEF DESCRIPTION OF THE DRAWINGS

FIG. 19 is a graph showing a luminance distribution in a main scanning direction; and FIG. 20 is a flowchart showing reading control processing.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present

First Embodiment

Figure 1:
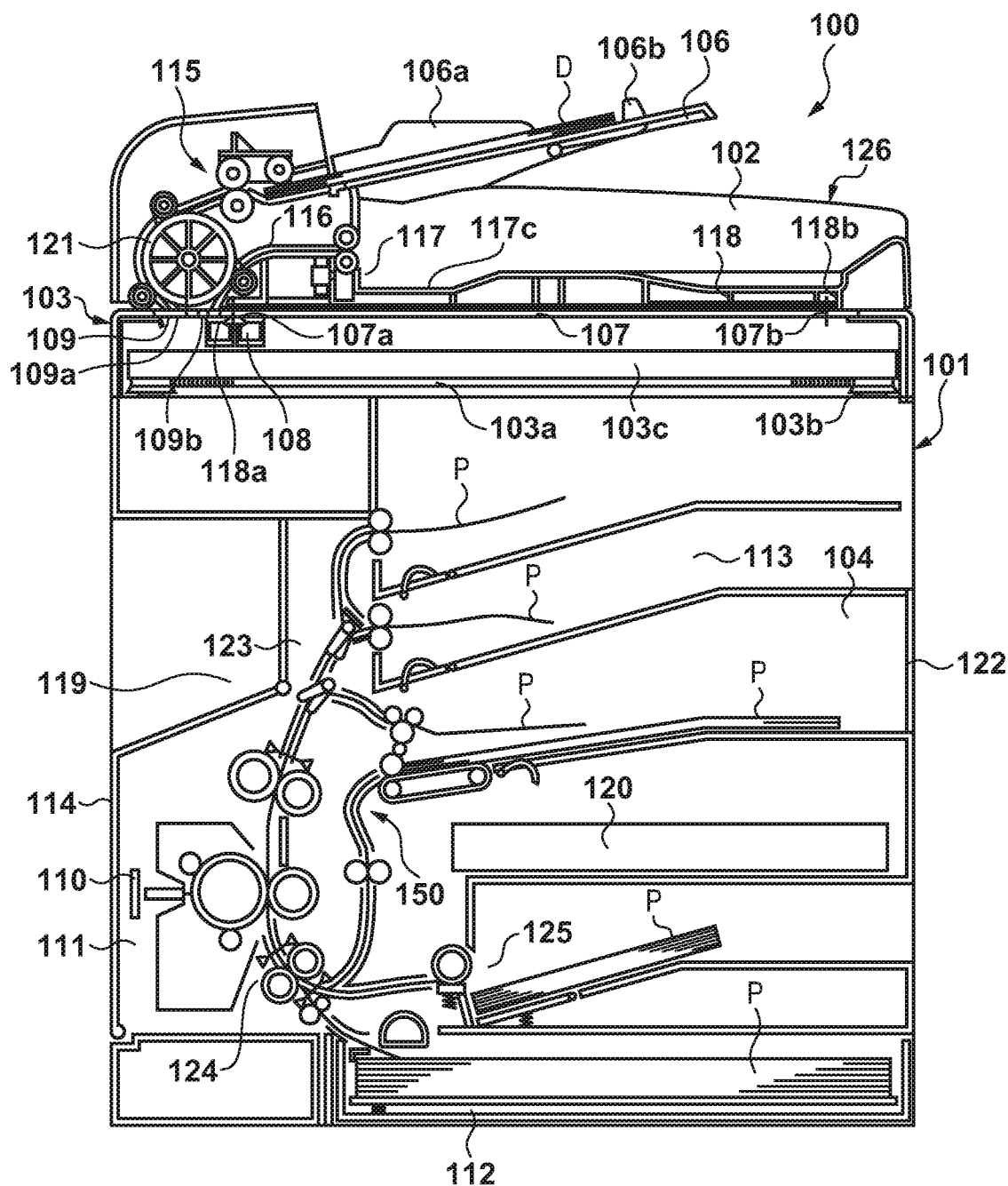
FIG. 1 is a view showing the arrangement of an image forming apparatus.
Figure 2:
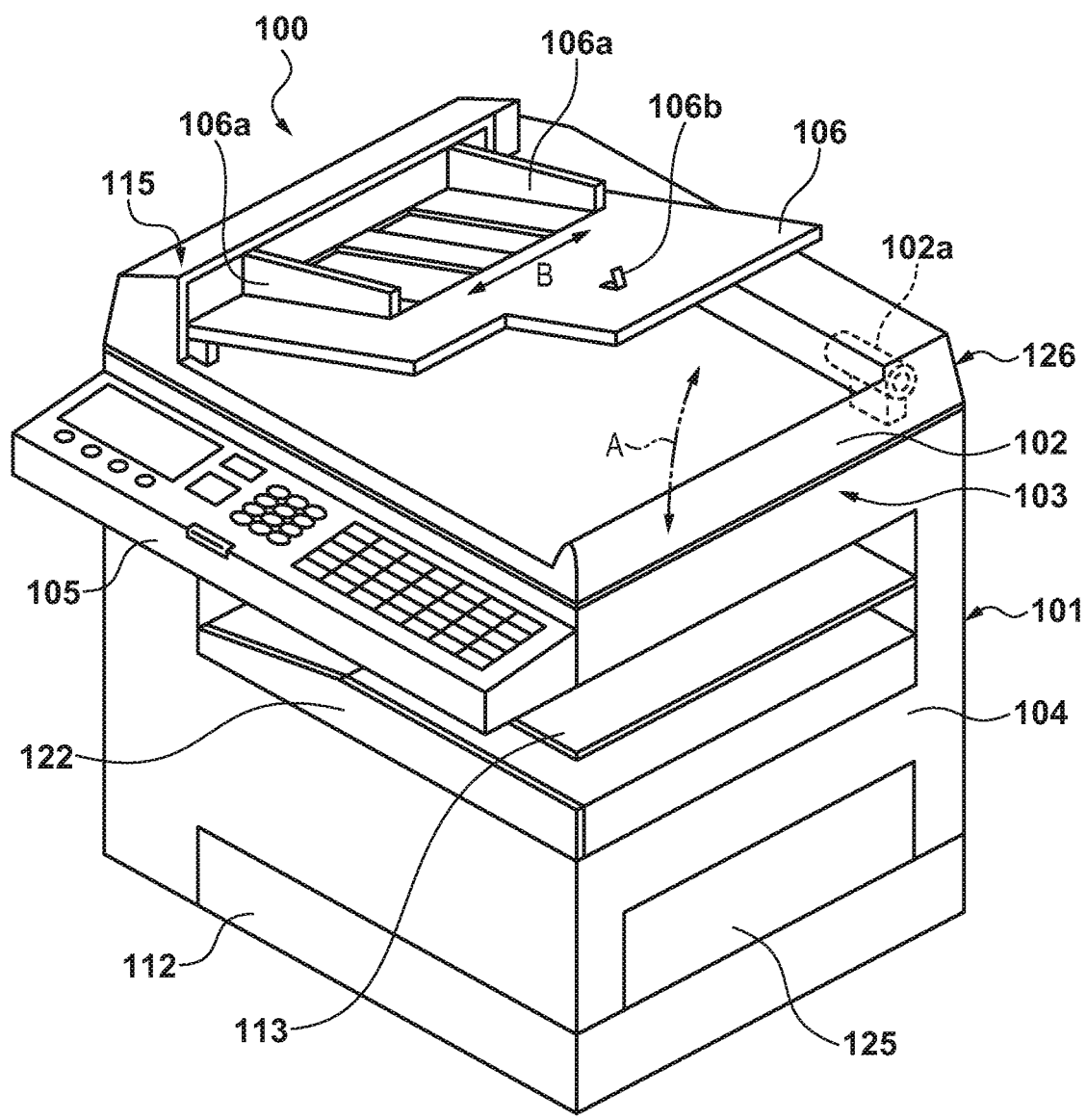
FIG. 2 is a perspective view showing the outer appearance of the image forming apparatus.
Figure 3:
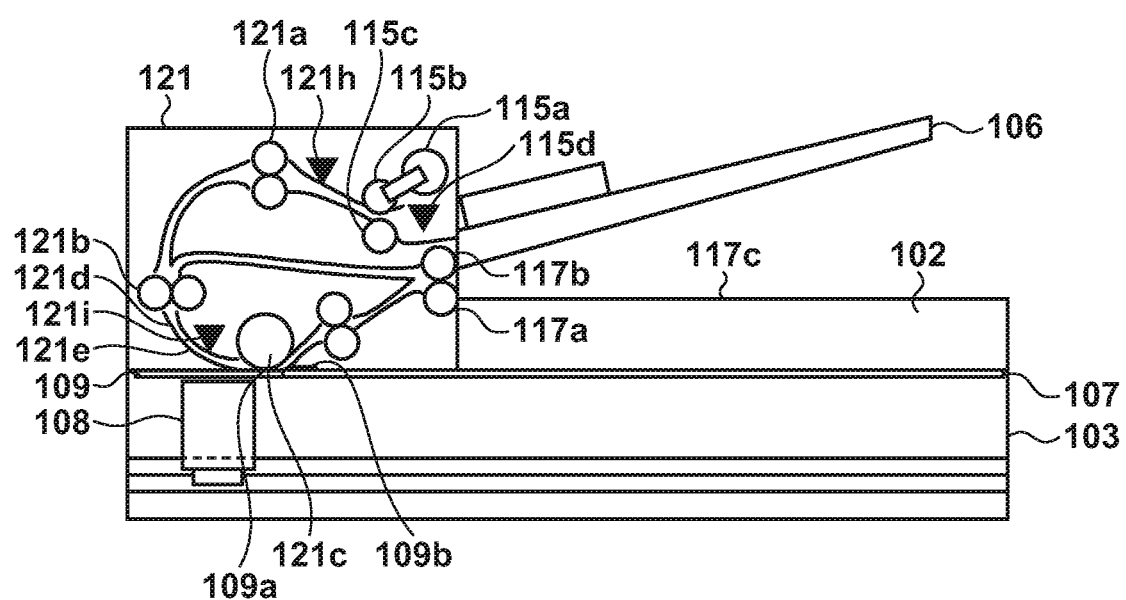
FIG. 3 is a view showing the arrangement of an image reading apparatus and an auto document feeder.

FIG. 1 is a sectional view showing an image forming apparatus 100 in a sheet conveyance direction according to this embodiment. FIG. 2 is a perspective view showing the outer appearance of the image forming apparatus 100 of FIG. 1. FIG. 3 is a sectional view showing an auto document feeder 126 and image reading apparatus 103 of the image forming apparatus 100 in a document conveyance direction. The arrangement of the image forming apparatus 100 will be described below with reference to FIGS. 1 to 3.

As shown in FIG. 1, the image forming apparatus 100 includes an apparatus main body 101, the image reading apparatus 103 provided on the apparatus main body 101, and the auto document feeder (ADF) 126 provided on the image reading apparatus 103. The image forming apparatus 100 is, for example, a multifunctional peripheral (MFP) obtained by combining the respective functions of a copying machine, printer, facsimile, and the like.

The auto document feeder 126 separates sheet documents D as printing media placed on a document mount table 106 one by one and supplies them to the image reading apparatus 103. The image reading apparatus 103 optically reads, with an image sensor unit 108, the sheet documents D fed onto a flow scanning glass 109 by the auto document feeder 126. An ADF pressure plate 102 includes the document mount table 106. The document mount table 106 includes a pair of sliders 106a which is slidable in a direction perpendicular to a sheet document conveyance direction (that is, the widthwise direction of a sheet document indicated by an arrow B in FIG. 2). This pair of sliders 106a can align the two sides of the sheet documents stacked on the document mount table 106. That is, the pair of sliders 106a can align the widths of the sheet documents. A document length sensor 106b is provided on the document mount table 106. An ADF separation unit 115 includes a plurality of document width sensors 115d each detecting the presence/absence and width of the sheet document in the widthwise direction of the sheet document as shown in FIG. 3. In FIG. 3, the document width sensors 115d overlap and appear as one in a depth direction, and thus the only one document width sensor 115d is shown. The image forming apparatus 100 can detect a document size and a document setting direction by detection signals from the document width sensors 115d and document length sensor 106b. The auto document feeder 126 also includes the ADF separation unit 115, a discharge conveyance unit 116, a document discharge unit 117, a document pressure plate 118 that presses book documents, and a sheet document conveyance unit 121. The document pressure plate 118 is formed by stacking a white sheet, a sponge, or the like in order to prevent a document placed on a document table glass 107 from floating. The respective units of the auto document feeder 126 such as the document pressure plate 118 and ADF pressure plate 102 that cover the document table glass 107 will generically be referred to as document covers hereinafter.

The document pressure plate 118 extends until a left end 118a of the document pressure plate 118 is positioned on the left side of a book reading range start position 107a, and a right end 118b is positioned on the right side of a book reading range end position 107b. As shown in FIG. 3, the sheet document conveyance unit 121 includes a document feed sensor 121h and a document end sensor 121i. The document feed sensor 121h detects whether the sheet document D is fed from the ADF separation unit 115 and the passage of the trailing end of the sheet document D. The document end sensor 121i detects the passage of the leading end and trailing end of the sheet document D. Detection signals from the document feed sensor 121h and document end sensor 121i are used for the timing control of reading processing.

The image reading apparatus 103 optically reads the sheet documents D or book documents as the printing media placed on the document table glass 107 while moving the line-type image sensor unit 108 (to be referred to as the image sensor unit 108 hereinafter) in a sub-scanning direction. Note that the sub-scanning direction is a right-and-left direction in FIGS. 1 and 3. The main scanning direction is a direction perpendicular to the sub-scanning direction and the direction of the arrow B in FIG. 2. The main scanning direction corresponds to the line direction of the image sensor unit 108. The image sensor unit 108 irradiates the image plane of the sheet document with light from a light source formed by including an LED, a resin light guide, and the like. Then, the image sensor unit 108 forms the image of light reflected by the image plane of the document in a light-receiving sensor such as a one-dimensional sensor element array with a SELFOC Lens® or the like and reads the image of the sheet document. The image sensor unit 108 can be moved by a timing belt 103a, a driving pulley 103b rotated by a driving motor, and a driven pulley along a guide shaft 103c in the right-and-left direction in FIGS. 1 and 3. The image sensor unit 108 is supported on the guide shaft 103c by a carriage and biased upward by a spring. The timing belt 103a and the carriage are connected by a connecting member. A spacer is inserted between the image sensor unit 108 and the document table glass 107. When the image sensor unit 108 reads the image of the document placed on the document table glass 107, it optically reads the document while moving a range from the book reading range start position 107a to the book reading range end position 107b of FIG. 1 at a constant speed.

A case will be described in which the image sensor unit 108 performs flow scanning. First, a user stacks the sheet document on the document mount table 106 with its reading surface (document surface) facing up. When the image reading apparatus 103 accepts an instruction to start image reading from the user via an operation unit 105, a pickup roller 115a moves downward while rotating, and the documents are separated one by one with a separation roller 115b and a separation pad 115c, and fed inside. Feeding rollers 121a, 121b, and 121c convey the document to a reading position along a U-turn path along a document guide 121d. The conveyed sheet document is pressed against and brought into tight contact with the flow scanning glass 109 by a sheet document press plate 121e pressed by a biasing spring. The sheet document is conveyed continuously during this time. At this time, the image sensor unit 108 has already moved to a sheet document reading position 109a and stopped, and read the image of the sheet document that passes through the sheet document reading position 109a. Next, a jump table 109b picks up the continuously conveyed sheet document on the side of the ADF pressure plate 102. Then, the reading conveyance roller 121c and a reading conveyance roller pressed against the reading conveyance roller 121c by a press spring convey the sheet document. Further, a discharge roller 117b and a reversing roller 117a pressed against the discharge roller 117b by a press spring discharge the sheet document to a document discharge tray 117c. When reading the two sides of the document, the reversing roller 117a and the discharge roller 117b reverse the document and convey it to the reading position again via a flapper (not shown). A document that has undergone image reading is discharged to the document discharge tray 117c. A sensor configured to detect the presence/absence of a printing medium in a conveyance path is arranged as needed in the conveyance path. A black stripe appears in reading data if a foreign substance such as dust or contamination sticks onto the sheet document reading position 109a corresponding to the reading position. Therefore, in order to prevent this, a control unit 400 of the image reading apparatus 103 detects a foreign substance region and corrects reading data corresponding to that region by interpolation processing or the like.

The apparatus main body 101 of the image forming apparatus 100 forms an image on the sheet based on reading data output from the image reading apparatus 103. The image reading apparatus 103 transmits reading data generated by reading an image to a printing apparatus main body 104 incorporated in the apparatus main body 101. The printing apparatus main body 104 is, for example, a printing apparatus that prints on the print medium by an electrophotographic printing method. The operation unit 105 in FIG. 2 includes a display unit, an input key, and the like, accepts operations of instructing and setting the image forming apparatus 100 by the user, and displays the state of the image forming apparatus 100, a processing progress state, various user interface screens, or the like. The apparatus main body 101 may form an image on the sheet based on image data received from an external host computer or the like.

The apparatus main body 101 also includes an LED printhead unit 110, an image forming unit 111, a cassette feed unit 112, a printing sheet discharge unit 113 configured to stack a plurality of sheets P in the upper part of the printing apparatus main body 104, and a cartridge cover portion 114. The apparatus main body 101 also includes a connection unit 119 that connects the image reading apparatus 103 and the printing apparatus main body 104, a control unit 120 of a facsimile apparatus, a double-sided conveyance unit cover 122, a conveyance direction switching unit 123, and a resist conveyance unit 124. The printing apparatus main body 104 includes a multi paper (MP) feed unit 125 and a double-sided conveyance unit 150.

The ADF pressure plate 102 shown in FIG. 2 is pivotally attached to the image reading apparatus 103 by a hinge portion 102a, and the user can open/close the auto document feeder 126 in the direction of an arrow A in FIG. 2. The hinge portion 102a is provided on either side of the rear of the apparatus main body 101, and the user can open the ADF pressure plate 102 backward by lifting up the ADF pressure plate 102 frontward. The hinge portion 102a can hold the ADF pressure plate 102 open at a predetermined angle, for example, 70° by combining a damper, a cam, a spring member, and the like. The user arranges the document such as the sheet document or book document on the document table glass 107 in a state in which the ADF pressure plate 102 is open.

Figure 5:
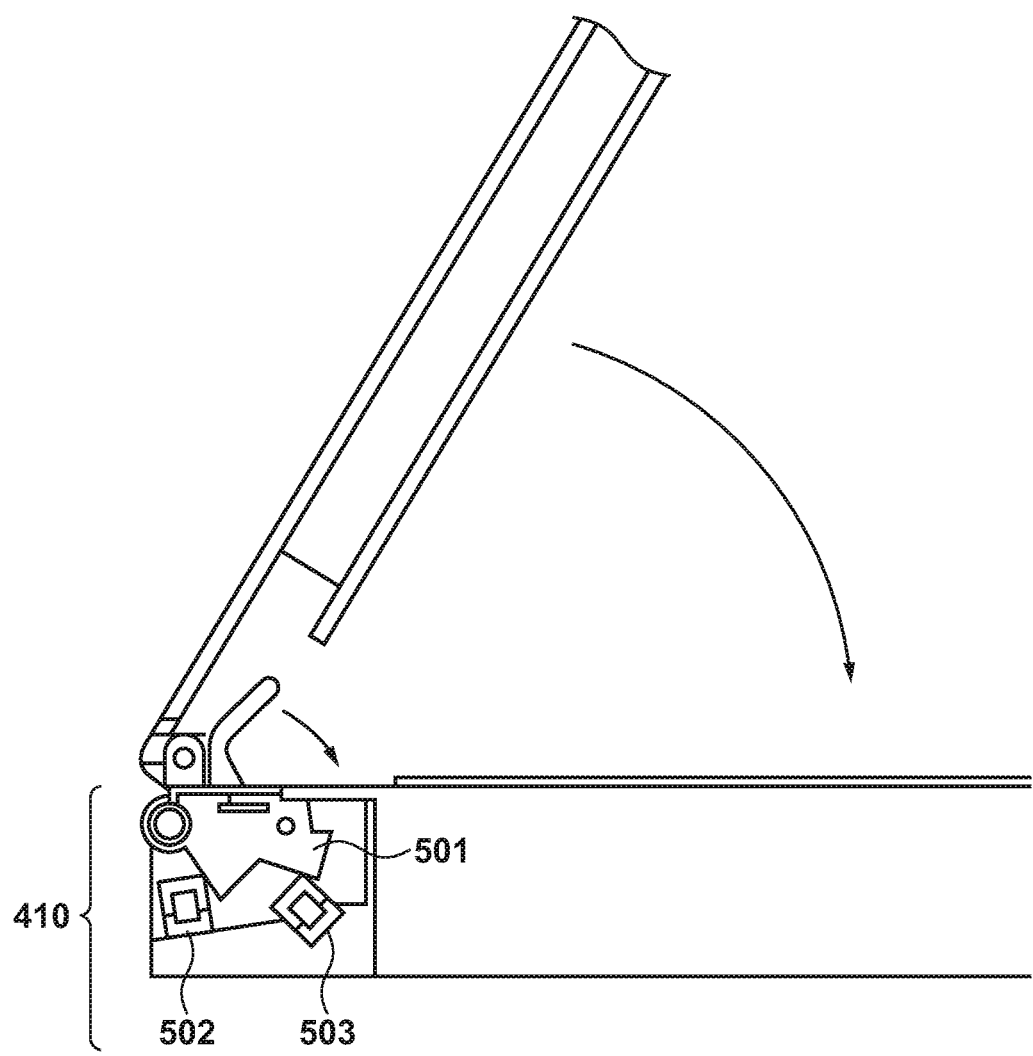
FIG. 5 is a view showing the arrangement of an opening/closing detection sensor.

The hinge portion 102a includes an opening/closing detection sensor 410 capable of detecting the opening/closing operation of the auto document feeder 126. The opening/closing detection sensor 410 includes two angle detection sensors 502 and 503 shown in FIG. 5 and a flag 501, and can detect a plurality of opening/closing angles with respect to the document table glass 107 of the auto document feeder 126. For example, the opening/closing detection sensor can detect, from the states of two angle detection sensors 502 and 503, and the flag 501, four types of angles, namely, an angle from 0° to 5°, an angle from 5° to 15°, an angle from 15° to 25°, and an angle equal to or more than 25° as the opening/closing state of the auto document feeder 126.

For example, if the angle detection sensor 502 is OFF (undetected), and the angle detection sensor 503 is ON (detected), it is determined that the opening/closing angle of the auto document feeder 126 is 0° to 5°. If the angle detection sensor 502 is ON, and the angle detection sensor 503 is ON, it is determined that the opening/closing angle of the auto document feeder 126 is 5° to 15°. If the angle detection sensor 502 is ON, and the angle detection sensor 503 is OFF, the opening/closing angle of the auto document feeder 126 is 15° to 25°. If the angle detection sensor 502 is OFF, and the angle detection sensor 503 is OFF, the opening/closing angle of the auto document feeder 126 is equal to or more than 25°.

In this embodiment, the plurality of sensors detect the opening/closing state of the auto document feeder 126 as described above. However, a single sensor may detect the opening/closing state of the auto document feeder 126. The opening/closing state of the auto document feeder 126 in a predetermined angle unit is determined. However, the opening/closing state of the auto document feeder 126 may be determined by detecting the unit as a continuous value and comparing it with a predetermined threshold.

Figure 4:
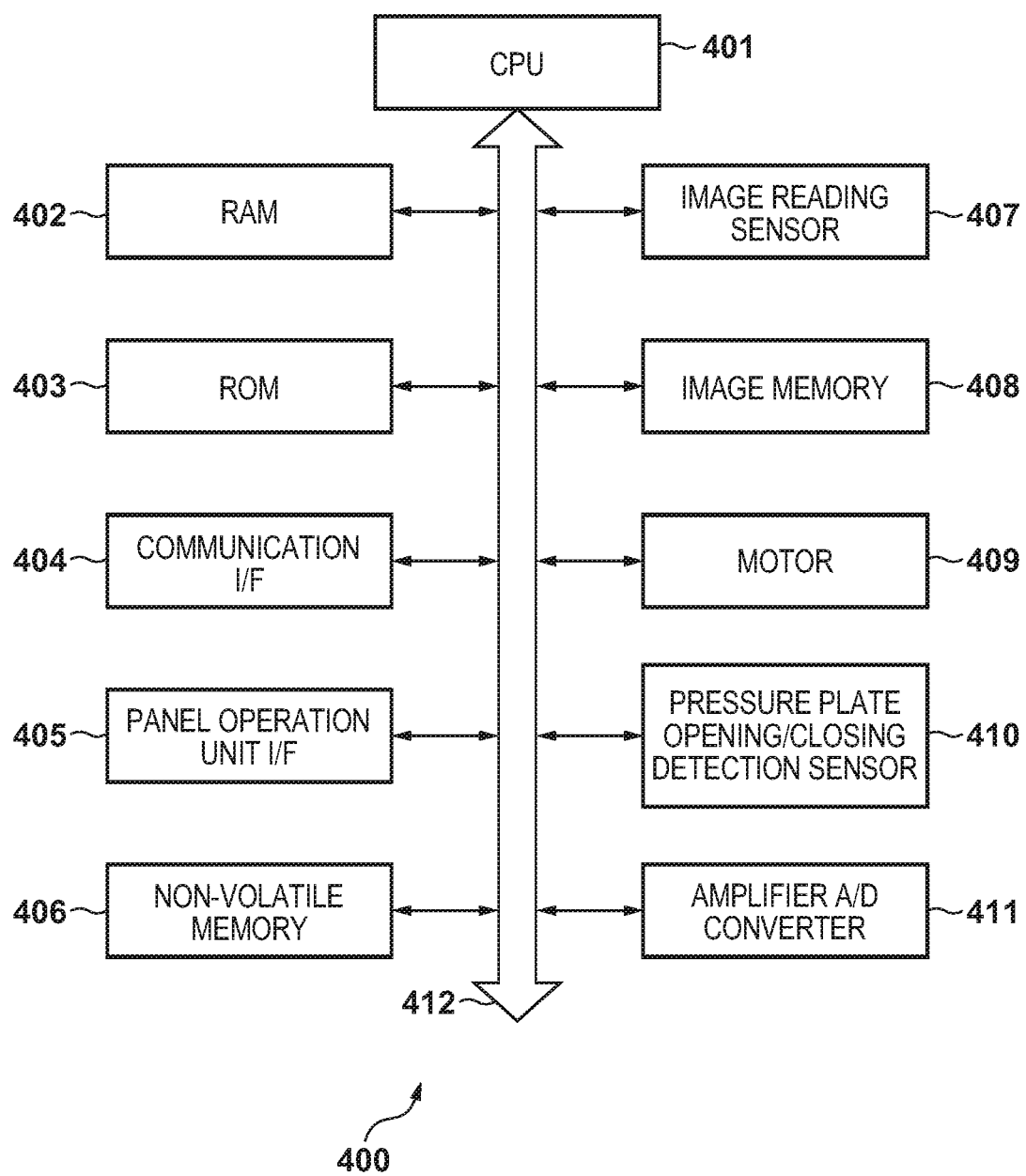
FIG. 4 is a block diagram showing the arrangement of a control system of the image reading apparatus.

FIG. 4 is a block diagram showing the arrangement of the control unit 400 that controls the image reading apparatus 103. The control unit 400 is arranged, for example, inside the image reading apparatus 103 and generally controls the image reading apparatus 103. A CPU 401, RAM 402, and ROM 403 that control respective blocks in the control unit 400 are connected to a bus line 412 arranged on a motherboard. The RAM 402 is used as, for example, a work area and temporary storage area for data of the CPU 401. For example, the ROM 403 stores a firmware program for driving the image reading apparatus 103 and a boot program for controlling the firmware program, and is read out and executed by the CPU 401. A communication interface (I/F) 404 serving as an interface with the apparatus main body 101, an operation unit I/F 405 serving as an interface with the operation unit 105, and a non-volatile memory 406 are further connected to the bus line 412. An image reading sensor 407, an image memory 408, a motor 409, and the opening/closing detection sensor 410 are further connected to the bus line 412. The image reading sensor 407 corresponds to the one-dimensional sensor element array of the image sensor unit 108 and outputs a reading signal. The image memory 408 is, for example, a line memory that temporarily holds reading data corresponding to the reading signal of the image sensor unit 108 output from the image reading sensor 407. The motor 409 is a motor configured to drive the timing belt 103a, the driving pulley 103b, and the like. An amplifier A/D converter 411 amplifies an analog reading signal output from the image reading sensor 407 and converts it into a digital signal. The respective blocks shown in FIG. 4 are connected to be communicable with each other via the bus line 412.

Figure 6:
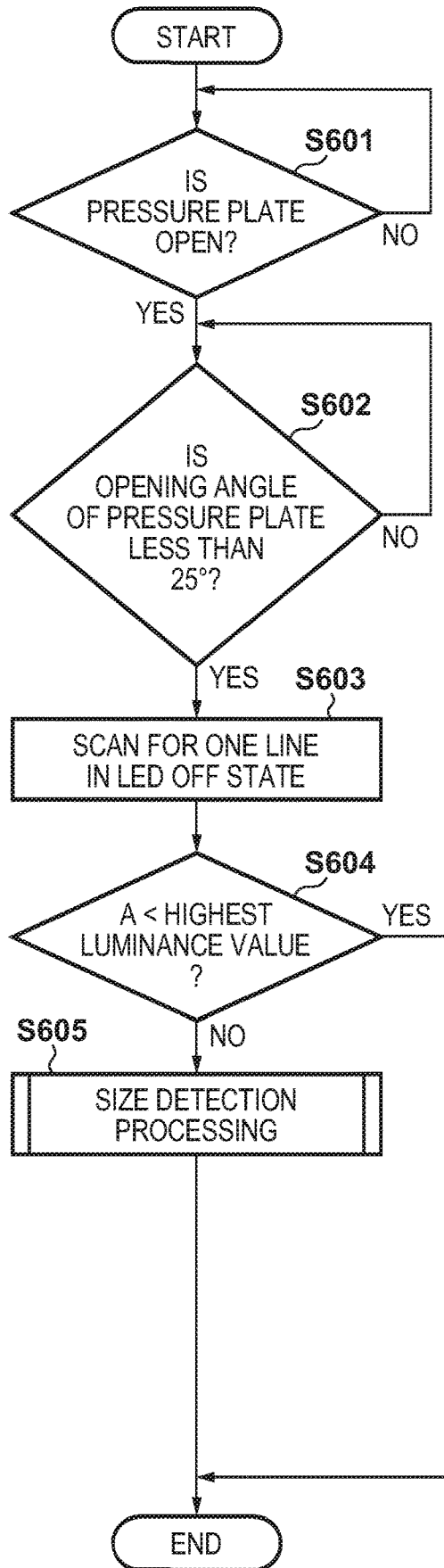
FIG. 6 is a flowchart showing reading control processing.

FIG. 6 is a flowchart showing reading control processing according to this embodiment. The processing of FIG. 6 is implemented by, for example, causing the CPU 401 to load programs stored in the ROM 403 into the RAM 402 and execute them.

In step S601, the CPU 401 determines whether the ADF pressure plate 102 is open by the opening/closing detection sensor 410 and repeats a process in step S601 until it determines that the ADF pressure plate 102 is open. A determination in step S601 may be made based on, for example, a detection that the ADF pressure plate 102 is not closed, that is, it is open at some angle. After the CPU 401 determines that the ADF pressure plate 102 is open, it determines whether the ADF pressure plate 102 is open at less than 25° and repeats a process in step S602 until it determines that the ADF pressure plate 102 is open at less than 25°. If the CPU 401 determines that the ADF pressure plate 102 is open at less than 25°, it starts the following size detection processing of the document placed on the document table glass 107.

The document size detection processing in this embodiment is performed by detecting an external light amount by the image reading sensor 407. That is, it uses an increase in luminance at the end of the image reading sensor 407 in the main scanning direction in a case in which the end is exposed to external light without being covered with the document when the document is placed on the document table glass 107.

In step S603, the CPU 401 obtains luminance values in the main scanning direction in a state in which the light source such as the LED of the image sensor unit 108 is turned off (OFF). At this time, the image sensor unit 108 is positioned at the book reading range start position 107a. In step S604, the CPU 401 determines whether the maximum luminance value out of the luminance values obtained in the main scanning direction is larger than a predetermined threshold A. If the CPU 401 determines here that the value is larger than the threshold A, it determines that there is external light, and the process advances to step S606. If the CPU 401 determines that the value is not larger than the threshold A (equal to or smaller than the threshold A), it determines that there is no external light, and the process advances to step S605. In step S605, the CPU 401 executes the first document size detection processing. After the processing in step S605, the CPU 401 terminates the processing of FIG. 6.

Figure 7:
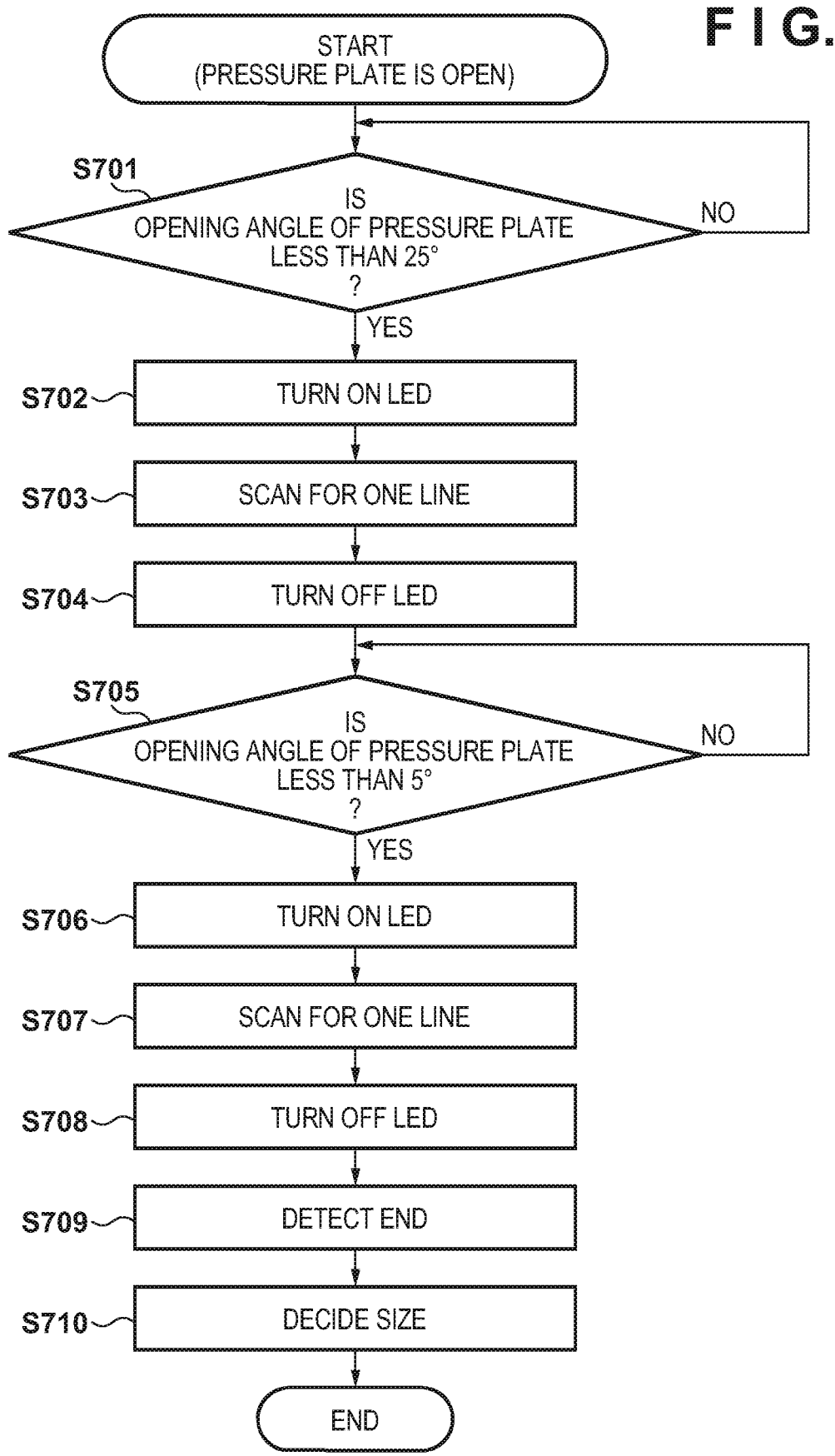
FIG. 7 is a flowchart showing processing in step S605.

FIG. 7 is a flowchart showing the first document size detection processing in step S605. In step S701, the CPU 401 determines whether the ADF pressure plate 102 is open at 5° (inclusive) to 25° (exclusive) by the opening/closing detection sensor 410 and repeats a process in step S701 until it determines that the ADF pressure plate 102 is open at 5° (inclusive) to 25° (exclusive). If the CPU 401 determines that the ADF pressure plate 102 is open at 5° (inclusive) to 25° (exclusive), it turns on (ON) the light source of the image sensor unit 108 in step S702 and obtains a luminance value for one entire line in the main scanning direction in step S703. After obtaining the luminance value for one entire line in the main scanning direction, the CPU 401 turns off the light source of the image sensor unit 108 in step S704.

In step S705, the CPU 401 determines whether the ADF pressure plate 102 is open at less than 5° by the opening/closing detection sensor 410 and repeats a process in step S705 until it determines that the ADF pressure plate 102 is open at less than 5°. If the CPU 401 determines that the ADF pressure plate 102 is open at less than 5°, it turns on the light source of the image sensor unit 108 in step S706 and obtains a luminance value for one entire line in the main scanning direction in step S707. After obtaining the luminance value for one entire line in the main scanning direction, the CPU 401 turns off the light source of the image sensor unit 108 in step S708.

In this embodiment, 25° is used as a reference in the determination of step S701, and 5° is used as a reference in the determination of step S705. However, the present invention is not limited to these angles. That is, the present invention is not limited to the angles of 25° and 5° as long as they can be identified as an angle capable of receiving light reflected from a white sheet attached to the ADF pressure plate 102 and an angle incapable of receiving the light when the light source of the image sensor unit 108 is turned on.

In step S709, the CPU 401 compares the luminance value obtained in step S703 with the luminance value obtained in step S707, and detects a region changing from a "black" luminance value to a "white" luminance value as a region not covered with the document. In step S710, the CPU 401 decides the size of the document placed on the document table glass 107 from the region detected in step S709. After a process in step S710, the CPU 401 terminates the processing of FIG. 7.

On the other hand, if the CPU 401 determines in step S604 of FIG. 6 that there is the external light, the following second document size detection processing is executed.

Figure 8:
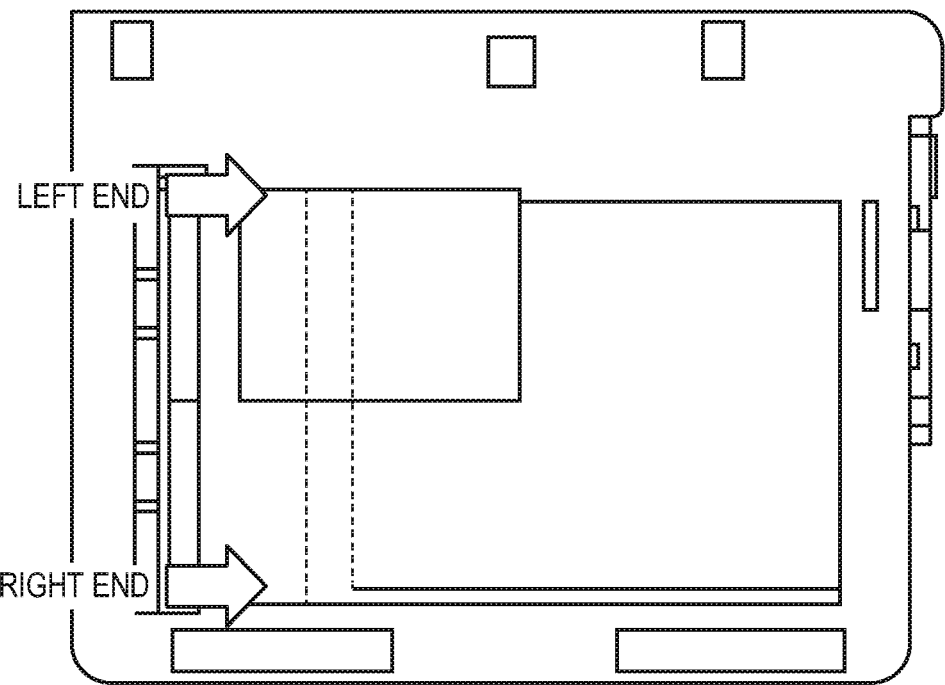
FIG. 8 is a view showing a state in which a document is placed.
Figure 9:
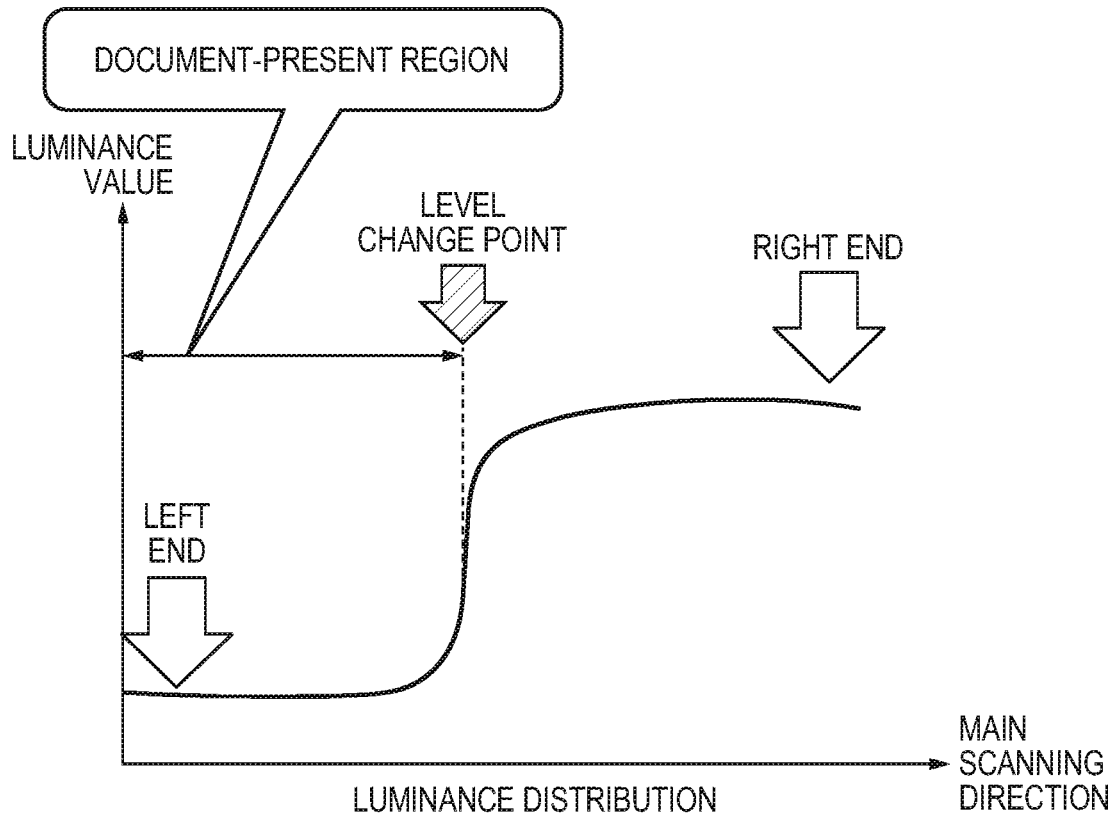
FIG. 9 is a graph for explaining specification of a document region.

In a case in which a document is placed on the document table glass 107 as shown in FIG. 8, luminance changes as shown in FIG. 9 if the document is scanned in a state in which the light source of the image sensor unit 108 is OFF. As shown here, in a reading image obtained in the state in which the light source is OFF, a luminance value becomes low in a portion where the document is placed because it is less influenced by the external light and becomes high in a portion where the document is not placed because it is influenced by the external light. In this embodiment, the length of a document in the main scanning direction is specified from a level change point between a document-present region covered with the document and a document-absent region not covered with the document. In this embodiment, luminance values at a plurality of spots in one line in the main scanning direction are obtained from a left end to a right end in FIG. 8 and based on the luminance values at the respective spots, a point where the luminance value changes by a threshold S or larger is detected as a document end.

In step S606, the CPU 401 determines whether the maximum luminance value out of the luminance values in the main scanning direction obtained in step S603 is equal to or larger than a predetermined threshold H. If the CPU 401 determines here that the value is equal to or larger than the threshold H, in step S607, it decreases an offset value when the image reading sensor 407 outputs a reading signal as correction for increasing a gap between the document-present region and the document-absent region. Note that if a readable reading value, for example, a luminance value falls within a range of 0 to 255, the threshold H is a value of 255 or a value as close to 255 as possible. The change amount of the offset value in step S607 is a value when the luminance value decreases by a difference between the minimum luminance value out of the luminance values in the main scanning direction obtained in step S603 and the readable lowest luminance value of 0. In step S608, the CPU 401 obtains the luminance value for one entire line in the main scanning direction again with the light source of the image sensor unit 108 being OFF, and the process advances to step S609.

In this embodiment, under a condition where the external light is strong as the maximum luminance value is equal to or larger than the predetermined threshold H in step S606, a so-called blown-out highlight state without any variation in light and shade is obtained, making it impossible to specify the document end appropriately. When the image sensor unit 108 uses a CIS (Contact Image Sensor), the influence of strong external light such as the westering sun is received more easily than in a reading method using a CCD (Charge Coupled Devices). To cope with this, in this embodiment, a document image is read darkly by decreasing an offset in step S607. As a result, it becomes easier to identify a gap in luminance value even if the external light is strong, making it possible to determine the document end appropriately in accordance with the condition of the external light. A method of outputting a reading signal for determining the document end may be replaced by another method as long as the same effect as decreasing the offset under the condition where the external light is strong is obtained. The CPU 401 may determine the document end by, for example, in step S607, decreasing a gain value if the light amount on the document table is equal to or larger than the threshold H and reading the document image darkly.

Figure 10A:
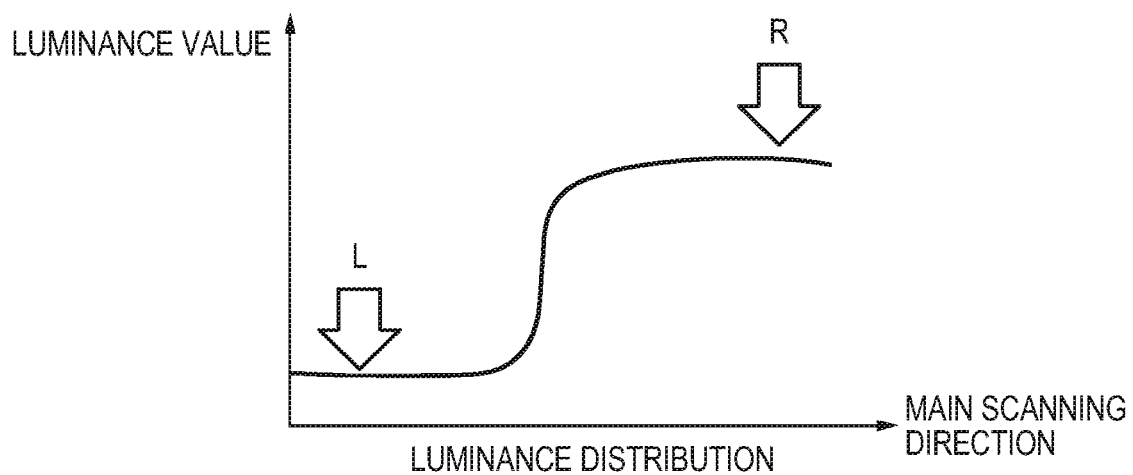
FIGS. 10A to 10C are graphs each showing a luminance distribution in a main scanning direction.

On the other hand, if the CPU 401 determines in step S606 that the highest luminance value is not equal to or larger than the threshold H, the process advances to step S609. In step S609, the CPU 401 obtains, out of the luminance values obtained in step S603 or S608, a luminance value R near the right end in the main scanning direction not covered with the document and a luminance value L at a position covered with the document near the left end in the main scanning direction as shown in FIG. 10A. Then, in step S610, the CPU 401 calculates a threshold S by calculating an average value of the luminance values R and L by:

$$S=(R+L)\div 2 \quad (1)$$

The CPU 401 detects, in step S611, a level change point for one entire line in the main scanning direction from the threshold S calculated in step S610 and decides a document size in the main scanning direction using the detected level change point as the document end in step S612. The document size is decided based on, for example, a table in which the position of the document end and a document length in the sub-scanning direction are associated with the document size. That is, the CPU 401 decides the document size from the detected position of the document end and detection signals from a plurality of sensors arranged in the sub-scanning direction in the lower part of the document table glass 107 with reference to the above-described table. A storage unit such as the ROM 403 stores the above-described table. Alternatively, in step S612, the CPU 401 may determine the presence/absence of a document based on detecting the position of the document end instead of deciding the document size and may perform subsequent control and the like by determining the presence/absence of the document.

Figure 10B:
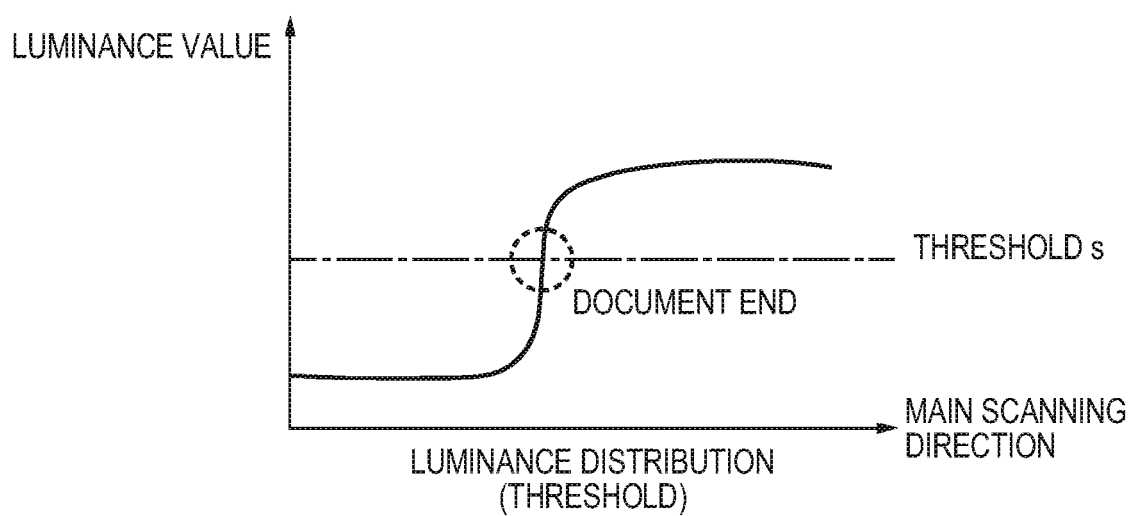
Figure 10C:
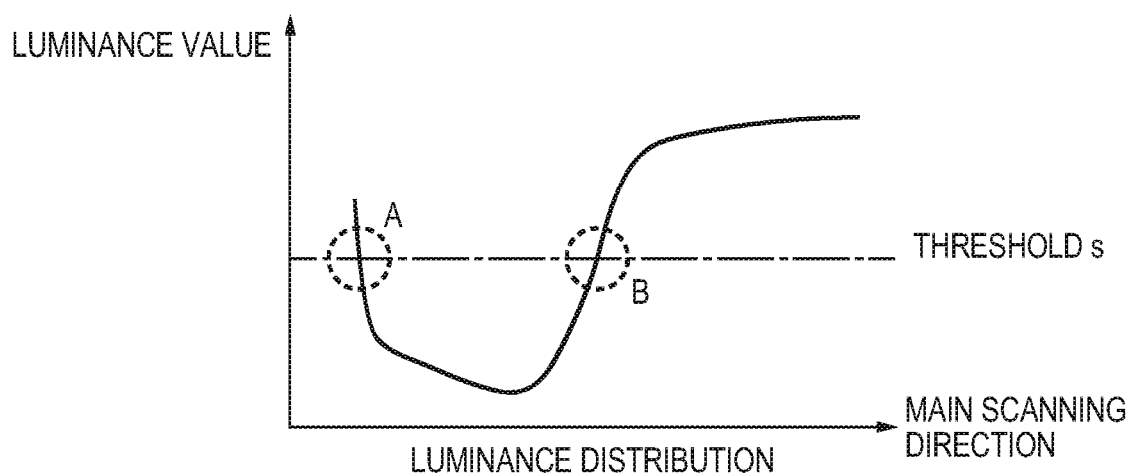

In this embodiment, as shown in FIG. 10B, a point exceeding the threshold S in a luminance distribution in the main scanning direction is detected and specified as the document end. Note that as shown in FIG. 10C, if points A and B at two spots are detected as change points crossing the threshold S, the point A at which the luminance value decreases from the left end to the right end in the main scanning direction is not specified as the document end. This is because in such a state, a change in the luminance value as shown in FIG. 10C occurs in a case in which, for example, the left end in the main scanning direction is set as a document abutting portion, and a gap occurs between the document and the abutting portion as shown in FIG. 8, which does not represent the document end.

After a process in step S612, the CPU 401 sets the offset value to read the document if the offset value is decreased in step S607, and then terminates the processing of FIG. 6. After the processing of FIG. 6, upon detecting that the ADF pressure plate 102 is closed, the CPU 401 reads, by the image sensor unit 108, the document placed on the document table glass 107. Note that the CPU 401 may be configured to read the document based on a user instruction if it does not detect that the ADF pressure plate 102 is closed owing to a thick document or the like.

As described above, according to this embodiment, a method of outputting the reading signal from the image reading sensor 407 of the image sensor unit 108 is changed in accordance with the condition of the external light. As a result, it is possible to detect the document end appropriately even if there is the influence from the external light. Moreover, even if the luminance value in the main scanning direction changes in accordance with the condition of the external light, it is also possible to detect the presence/absence and size of the document on the document table glass 107 appropriately by calculating a threshold in accordance with that change.

In this embodiment, the CPU 401 detects the document end as in steps S606 to S613 if it determines that the highest luminance value obtained when the light source is OFF is larger than the threshold A and is influenced by the external light, and detects the document end as in step S605 and FIG. 7 if it determines that the highest luminance value obtained when the light source is OFF is smaller than the threshold A and is not influenced by the external light. This makes it possible to determine the document end appropriately in cases in which the influence of the external light is received and is not received. It is therefore possible to detect the presence/absence and size of the document on the document table glass 107 appropriately.

Second Embodiment

The second embodiment will be described below with respect to a difference from the first embodiment.

Figure 11:
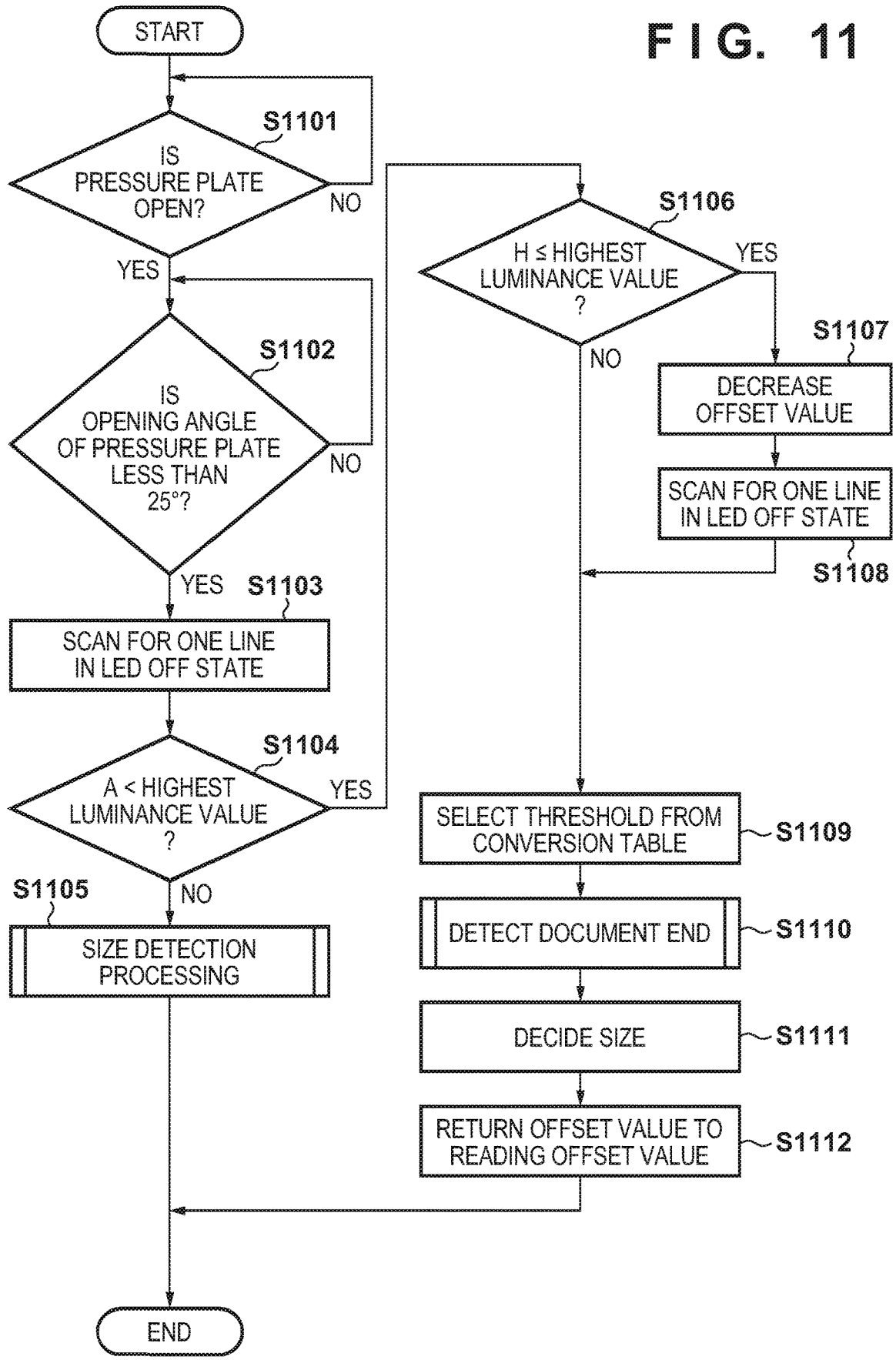
FIG. 11 is a flowchart showing reading control processing.

FIG. 11 is a flowchart showing document size detection processing according to this embodiment. The processing of FIG. 11 is implemented by, for example, causing a CPU 401 to load programs stored in a ROM 403 into a RAM 402 and execute them.

Processes in steps S1101 to S1108 are the same as a description in steps S601 to S608 of FIG. 6, and thus a description thereof will be omitted.

In this embodiment, luminance values at a plurality of spots in one line in a main scanning direction are obtained, and if the change amount of the luminance values between the respective spots for each of predetermined intervals is equal to or larger than a threshold, a portion between the spots in which the change amount is equal to or larger than the threshold is specified as a document end.

In step S1109, the CPU 401 obtains a difference between the maximum value and the minimum value out of the luminance values in the main scanning direction obtained in step S1103, and obtains a threshold T corresponding to the obtained difference with reference to a conversion table. A storage unit such as the ROM 403 stores the conversion table. Note that the conversion table at this time may be, for example, a table in which a plurality of thresholds obtained based on equation (1) described above correspond to a luminance difference between the maximum value and the minimum value. The CPU 401 detects the change amount of the luminance values between the respective spots for each of the predetermined intervals from a luminance value near a left end where an image reading sensor 407 is covered with a document to a luminance value at a right end and in step S1110, detects a spot where the change amount of the luminance values becomes larger than the threshold T and specifies it as a document end.

Figure 13:
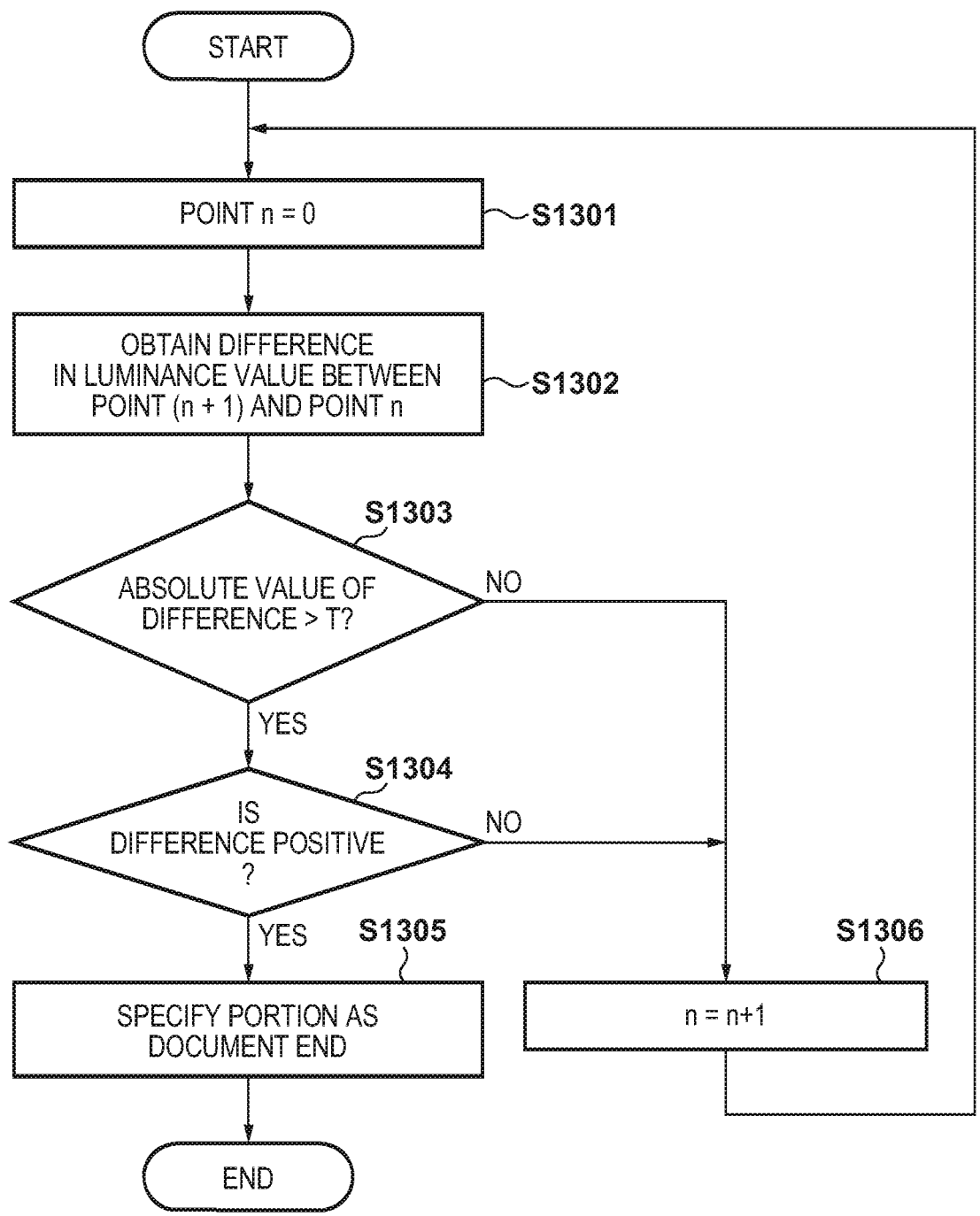
FIG. 13 is a flowchart showing document end detection processing.

FIG. 13 is a flowchart showing a process of specifying the document end in step S1110 based on the threshold obtained in step S1109. The process of FIG. 13 is implemented by, for example, causing the CPU 401 to load programs stored in the ROM 403 into the RAM 402 and execute them.

In step S1301, the CPU 401 keeps, in the storage area of the RAM 402 or the like, a variable n that indicates positions corresponding to the above-described plurality of spots in the main scanning direction on an image sensor unit 108 and initializes the variable n by an initial value 0 that indicates a position at the left end near a document abutting portion. In step S1302, the CPU 401 obtains a difference Diff between a luminance value corresponding to the position of a variable (n+1) and a luminance value corresponding to the position of the variable n by:

$$\text{Diff}=(n+1)-n \quad (2)$$

In step S1303, the CPU 401 determines whether the absolute value of the difference Diff obtained in step S1302 is larger than the threshold T. If the CPU 401 determines here that the absolute value of the difference Diff is larger than the threshold T, the process advances to step S1304. If the CPU 401 determines that the absolute value is not larger than the threshold T, the process advances to step S1306.

At this time, a luminance difference becomes large between the regions of the document end with the document and without any document. Accordingly, if the absolute value of the difference Diff is larger than the threshold, the possibility of the document end is high, and the process advances to step S1304 in which the document end is further determined. If the absolute value of the difference Diff is smaller than the threshold, the possibility of the document end is low. Therefore, the process advances to step S1306 in which a determination of whether the next pixel is the document end in the main scanning direction is made.

In step S1304, the CPU 401 determines whether the difference Diff is positive or negative. If the CPU 401 determines that the difference Diff is positive, the process advances to step S1305. If the CPU 401 determines that the difference Diff is negative, the process advances to step S1306. In step S1306, the CPU 401 increments the variable n and repeats a process from step S1301. In step S1305, the CPU 401 specifies a portion between the respective positions of the variable n and variable (n+1) as the document end. After a process in step S1305, the CPU 401 terminates the process of FIG. 13.

Figure 12A:
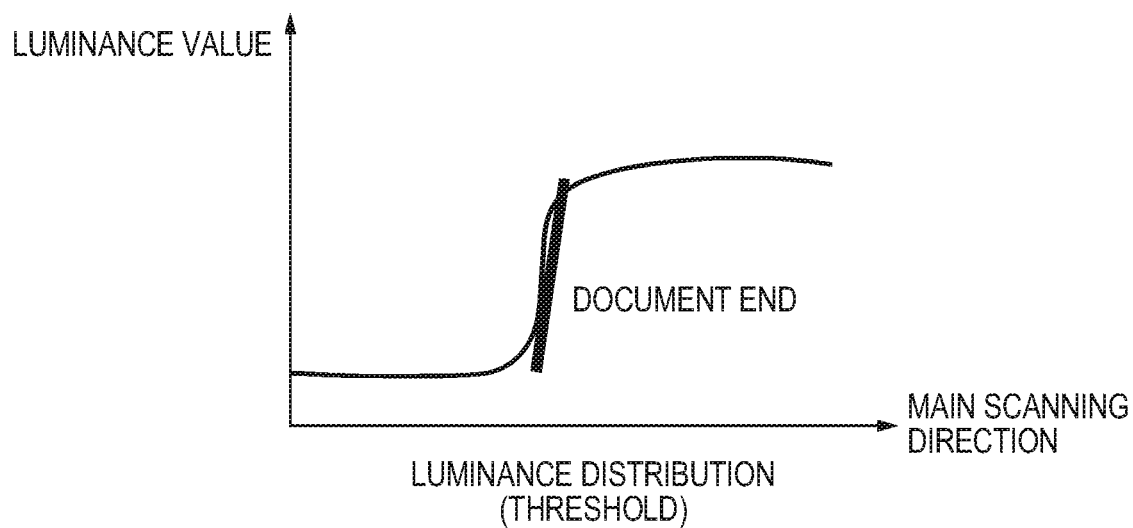
FIGS. 12A and 12B are graphs each showing a luminance distribution in a main scanning direction.
Figure 12B:
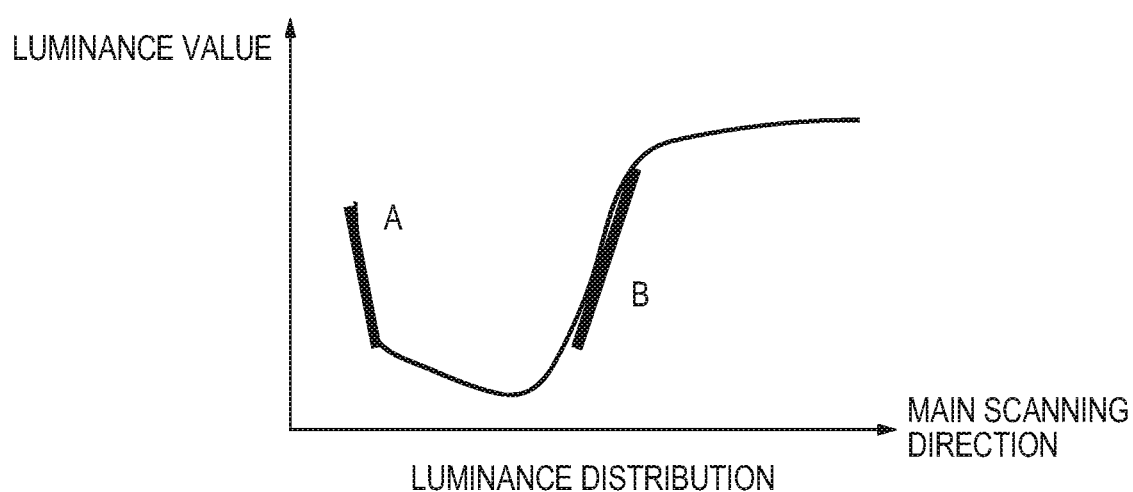

In this embodiment, as shown in FIG. 12A, the CPU 401 specifies, as a document end, the change amount of a luminance value in a luminance distribution in the main scanning direction, for example, a point at which the above-described difference Diff exceeds the threshold T. Note that when the change amounts of luminance values at two spots A and B are detected as points exceeding the threshold as shown in FIG. 12B, the difference Diff obtained by equation (2) described above is negative at the point A where the luminance value decreases from the left end to the right end of FIG. 12B, and thus the point is not determined as the document end in step S1304. This is because in such a state, a change in the luminance value as shown in FIG. 12B occurs in a case in which, for example, the left end in the main scanning direction is set as a document abutting portion, and a gap occurs between the document and the abutting portion as shown in FIG. 8, which does not represent the document end. Then, the difference Diff is positive at the point B where luminance increases from the left end to the right end, and thus the point is determined as the document end in step S1304.

The processes in steps S1111 and S1112 of FIG. 11 are the same as a description in steps S612 and S613 of FIG. 6, and thus a description thereof will be omitted.

As described above, according to this embodiment, a method of outputting the reading signal from the image reading sensor 407 of the image sensor unit 108 is changed in accordance with the condition of the external light. As a result, it is possible to detect the document end appropriately even if there is the influence from the external light. Moreover, even if the luminance value in the main scanning direction changes in accordance with the condition of the external light, it is also possible to detect the document end on a document table glass 107 appropriately by calculating a threshold in accordance with that change. It is further possible to detect the document end appropriately in accordance with the condition of the external light because a method of determining the document end is changed between times when the influence of the external light is received and is not received.

In the embodiment described above, an arrangement has been adopted in which the end, presence/absence, and size of the document are determined by the reading signal from the image reading sensor 407 of the image sensor unit 108. However, an arrangement may be adopted in which a light-receiving sensor that receives light on the document table glass 107 is provided without using a sensor that reads an image, and the end, presence/absence, and size of the document are determined from the light-reception result of that light-receiving sensor, or in which the determination is made by combining the image reading sensor 407 and the light-receiving sensor.

An arrangement for changing the offset value has been described above. An embodiment with the arrangement for changing a gain will be described below.

Third Embodiment

Figure 14:
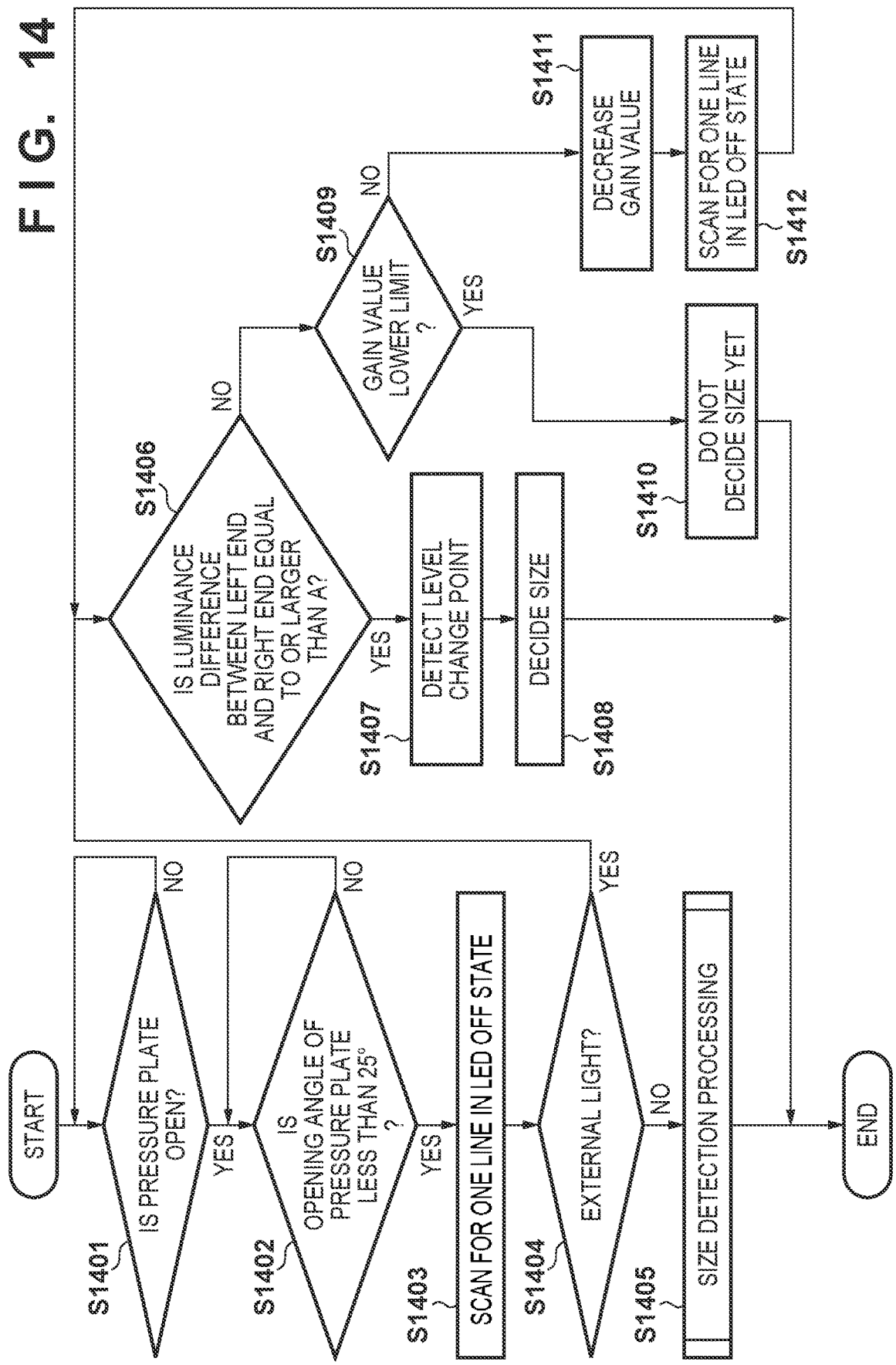
FIG. 14 is a flowchart showing reading control processing.

FIG. 14 is a flowchart showing reading control processing according to this embodiment. The processing of FIG. 14 is implemented by, for example, causing a CPU 401 to load programs stored in a ROM 403 into a RAM 402 and execute them.

In step S1401, the CPU 401 determines whether an ADF pressure plate 102 is open by an opening/closing detection sensor 410 and repeats a process in step S1401 until it determines that the ADF pressure plate 102 is open. A determination in step S1401 may be made based on, for example, a detection that the ADF pressure plate 102 is not closed, that is, open at some angle. After the CPU 401 determines that the ADF pressure plate 102 is open, it determines whether the ADF pressure plate 102 is open at less than 25° and repeats a process in step S1402 until it determines that the ADF pressure plate 102 is open at less than 25°. If the CPU 401 determines that the ADF pressure plate 102 is open at less than 25°, it starts the following size detection processing of a document placed on a document table glass 107.

The document size detection processing in this embodiment is performed by detecting an external light amount by an image reading sensor 407. That is, it uses an increase in luminance at the end of the image reading sensor 407 in a main scanning direction in a case in which the end is exposed to external light without being covered with the document when the document is placed on the document table glass 107.

In step S1403, the CPU 401 obtains luminance values in the main scanning direction in a state in which a light source such as an LED of an image sensor unit 108 is turned off (OFF). At this time, the image sensor unit 108 is positioned at a book reading range start position 107a. In step S1404, the CPU 401 determines whether there is the external light on the document table glass 107. A determination in step S1404 is made by, for example, determining whether the maximum luminance value out of the luminance values obtained in the main scanning direction is larger than a predetermined threshold. If the CPU 401 determines here that the value is larger than the threshold, it determines that there is the external light, and the process advances to step S1406. If the CPU 401 determines that the value is not larger than the threshold (equal to or smaller than the threshold), it determines that there is no external light, and the process advances to step S1405. In step S1405, the CPU 401 executes the first document size detection processing. After the processing in step S1405, the CPU 401 terminates the processing of FIG. 14.

Figure 15:
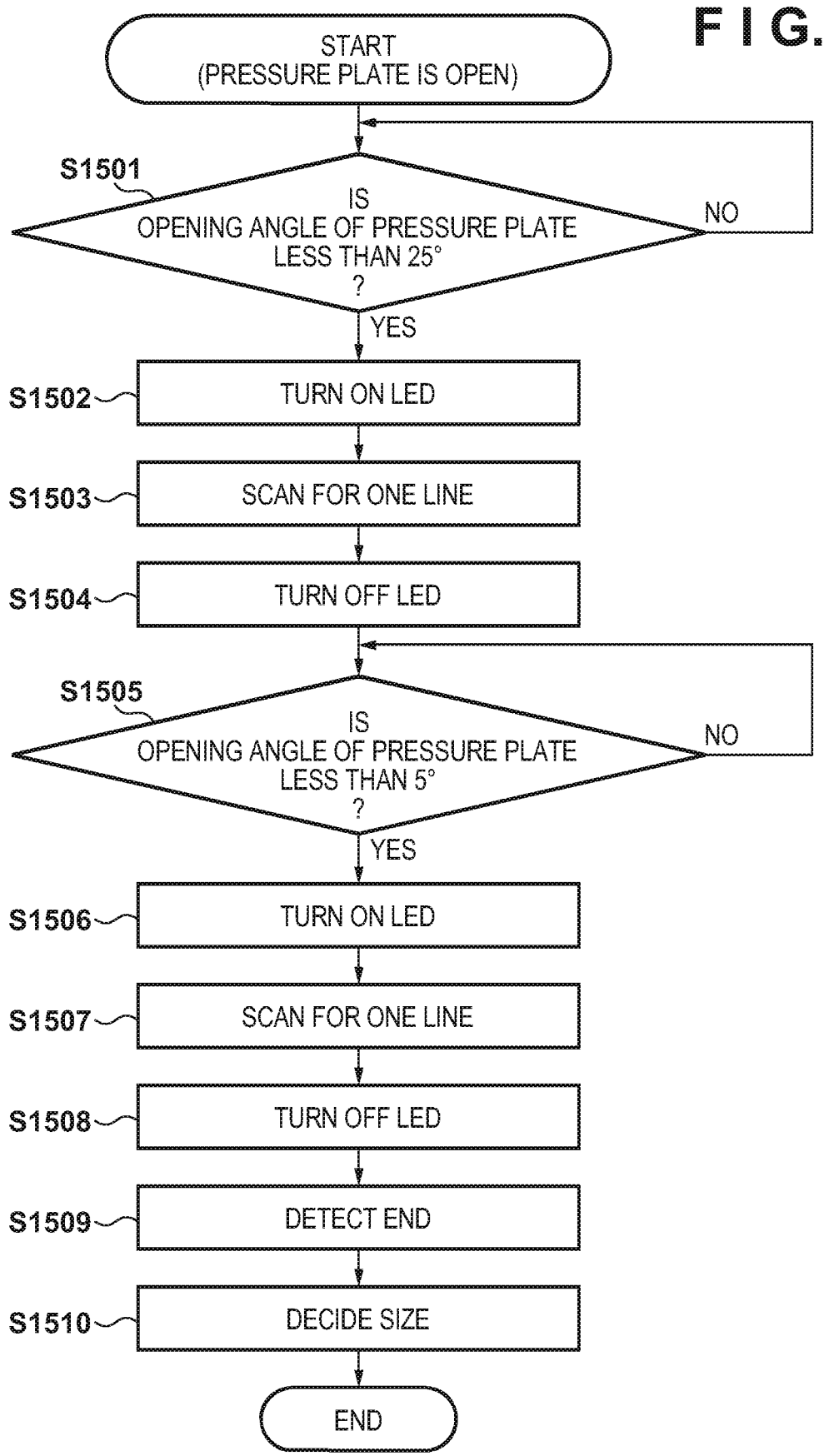
FIG. 15 is a flowchart showing processing in step S605.

FIG. 15 is a flowchart showing the first document size detection processing in step S1405. In step S1501, the CPU 401 determines whether the ADF pressure plate 102 is open at 5° (inclusive) to 25° (exclusive) by the opening/closing detection sensor 410 and repeats a process in step S1501 until it determines that the angle is 5° (inclusive) to 25° (exclusive). If the CPU 401 determines that the ADF pressure plate 102 is open at 5° (inclusive) to 25° (exclusive), it turns on (ON) the light source of the image sensor unit 108 in step S1502 and obtains a luminance value for one entire line in the main scanning direction in step S1503. After obtaining the luminance value for one entire line in the main scanning direction, the CPU 401 turns off the light source of the image sensor unit 108 in step S1504.

In step S1505, the CPU 401 determines whether the ADF pressure plate 102 is open at less than 5° by the opening/closing detection sensor 410 and repeats a process in step S1505 until it determines that the ADF pressure plate 102 is open at less than 5°. If the CPU 401 determines that the ADF pressure plate 102 is open at less than 5°, it turns on the light source of the image sensor unit 108 in step S1506 and obtains a luminance value for one entire line in the main scanning direction in step S1507. After obtaining the luminance value for one entire line in the main scanning direction, the CPU 401 turns off the light source of the image sensor unit 108 in step S1508.

In this embodiment, 25° is used as a reference in a determination in step S1501, and 5° is used as a reference in a determination in step S1505. However, the present invention is not limited to these angles. That is, the present invention is not limited to the angles of 25° and 5° as long as they can be identified as an angle capable of receiving light reflected from a white sheet attached to the ADF pressure plate 102 and an angle incapable of receiving the light when the light source of the image sensor unit 108 is turned on.

In step S1509, the CPU 401 compares data on the luminance value obtained in step S1503 with data on the luminance value obtained in step S1507, and detects a region changing from a "black" luminance value to a "white" luminance value as a region not covered with the document. In step S1510, the CPU 401 decides the size of the document placed on the document table glass 107 from the region detected in step S1509. After a process in step S1510, the CPU 401 terminates the processing of FIG. 15.

On the other hand, if the CPU 401 determines in step S1404 of FIG. 14 that there is the external light, the following second document size detection processing is executed.

Figure 16A:
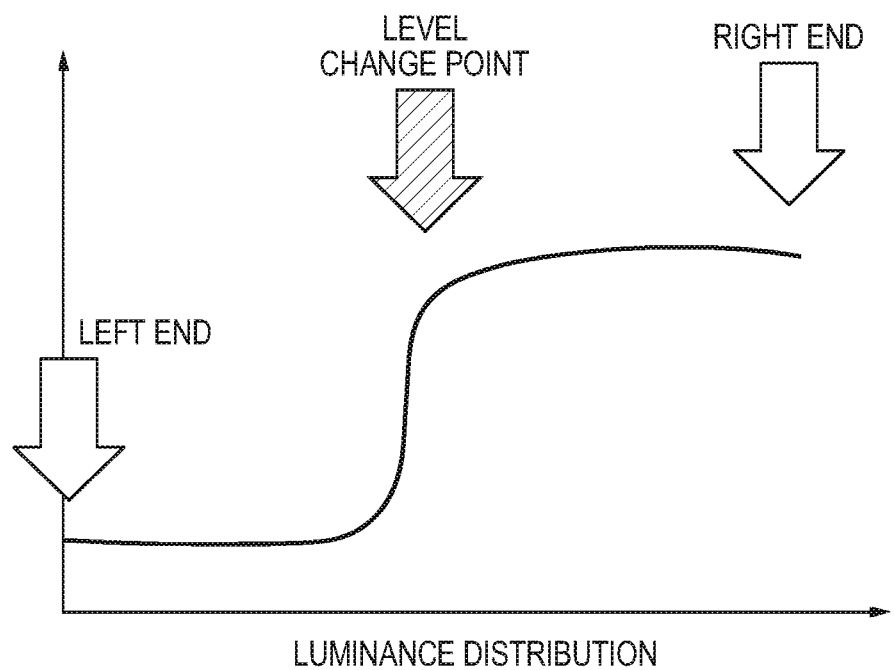
FIGS. 16A and 16B are graphs each showing a luminance distribution in a main scanning direction.

In a case in which a document is placed on the document table glass 107 as shown in FIG. 8, luminance changes as shown in FIG. 16A if the document is scanned in a state in which the light source of the image sensor unit 108 is OFF. In this embodiment, the length of a document in the main scanning direction is specified from a level change point between a document-present region covered with the document and a document-absent region not covered with the document. In this embodiment, luminance values at a plurality of spots in one line in the main scanning direction are obtained from a left end to a right end in FIG. 8 and based on the luminance values at the respective spots, a point where the luminance value changes is detected as a document end.

Figure 16B:
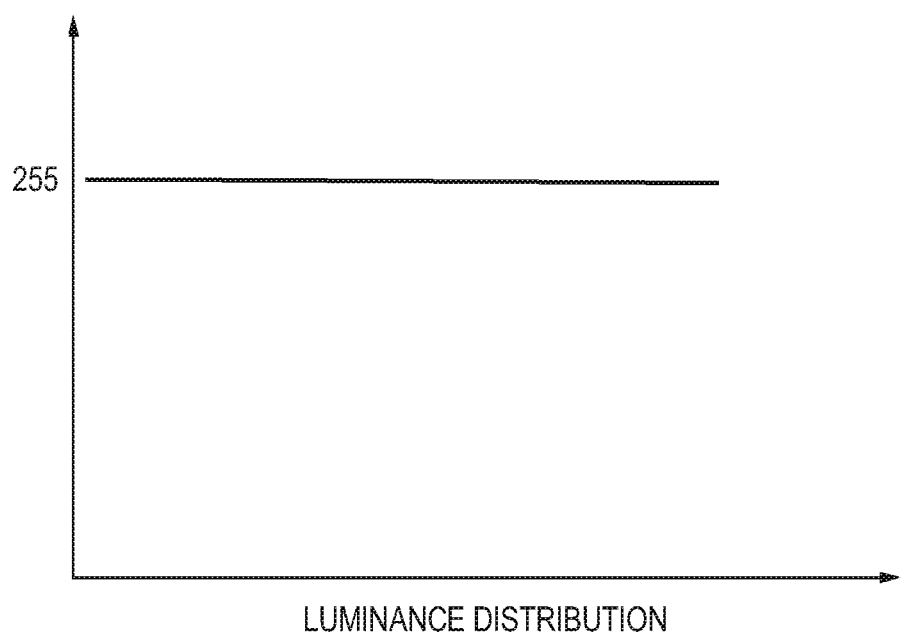

In step S1406, the CPU 401 determines whether a difference in luminance value between the left end and the right end out of the luminance values in the main scanning direction obtained in step S1403 is equal to or larger than a predetermined threshold A. If the CPU 401 determines here that the value is equal to or larger than the threshold A, it detects a level change point for one entire line in the main scanning direction in step S1407 and decides a document size in the main scanning direction using the detected level change point as the document end in step S1408. Note that the luminance values in the document-present region and document-absent region are influenced by the intensity of the external light. Therefore, a threshold for detecting the level change point needs to be changed by the intensity of the external light. As a method thereof, for example, an average value of the luminance values at the left end and right end is used as a threshold. On the other hand, if the CPU 401 determines in step S1406 that the difference is not equal to or larger than the threshold A, in this embodiment, it cannot detect the level change point because, for example, the entire main scanning direction is bright and sticks to a white level (luminance value 255) as shown in FIG. 16B. In this case, the process advances to step S1409.

The document size is decided in step S1408 based on, for example, a table in which the position of the document end and a document length in a sub-scanning direction are associated with the document size. That is, the CPU 401 decides the document size from the detected position of the document end and detection signals from a plurality of sensors arranged in the sub-scanning direction in the lower part of the document table glass 107 with reference to the above-described table. Alternatively, in step S1408, the CPU 401 may determine the presence/absence of a document based on detecting the level change point instead of deciding the document size. In this case, for example, a method of determining that there is no document if the document does not correspond to any size is used. A storage unit such as the ROM 403 stores the above-described table.

In step S1409, the CPU 401 determines whether a currently set gain value is a lower limit value. If the CPU 401 determines here that the gain value is the lower limit value, the process advances to step S1410 in which it determines that the document size is undecided, and then terminates the processing of FIG. 14. At this time, the CPU 401 may display an alarm indicating that the document size cannot be decided on the panel of an operation unit 105.

On the other hand, if the CPU 401 determines in step S1409 that the gain value is not the lower limit value, the process advances to step S1411 in which it reads the document darkly by decreasing the gain value. In step S1412, the CPU 401 obtains the luminance value for one entire line in the main scanning direction again with the light source of the image sensor unit 108 being OFF. Then, the CPU 401 repeats the process from step S1406. In the processing of FIG. 14, if the CPU 401 changes the gain value in step S1411, it resets the gain value to read a document image before terminating the flowchart of FIG. 14.

Under a condition where the external light is strong, a so-called blown-out highlight state is obtained in which there is no variation in light and shade between portions where the document is placed and is not placed, making it impossible to specify the document end appropriately. In particular, when the image sensor unit 108 uses a CIS (Contact Image Sensor), the influence of external light is received more easily than in a reading method using a CCD (Charge Coupled Devices). To cope with this, in this embodiment, a method of outputting a reading signal for determining the document end is changed by reading the document image more darkly than in reading an image by decreasing the gain value in step S1411. As a result, it becomes easier to identify a gap in luminance value, making it possible to determine the document end appropriately in accordance with an outside condition. It is therefore possible to determine the document end appropriately even if the CIS which is easily influenced by the external light is used, and the influence of strong external light such as the westering sun is received.

As described above, according to this embodiment, the gain value is decreased when the document end cannot be detected, making it possible to detect the document end even under the influence of the strong external light and to decide the document size appropriately. The gain value is changed between times when the document image is read and when the document end is determined, making it possible to determine the document end more accurately even if the influence of the external light is received when the document end is determined.

In the above-described embodiment, an arrangement has been adopted in which the gain value is changed when the document end is determined. However, an arrangement may be adopted in which the document end is determined easily by changing the offset value. In this case as well, it is possible, by changing the gain value between times when the document image is read and when the end is determined, to determine the document end more accurately even if the influence of the external light is received.

Fourth Embodiment

The fourth embodiment will be described below with respect to a difference from other embodiments.

Figure 17:
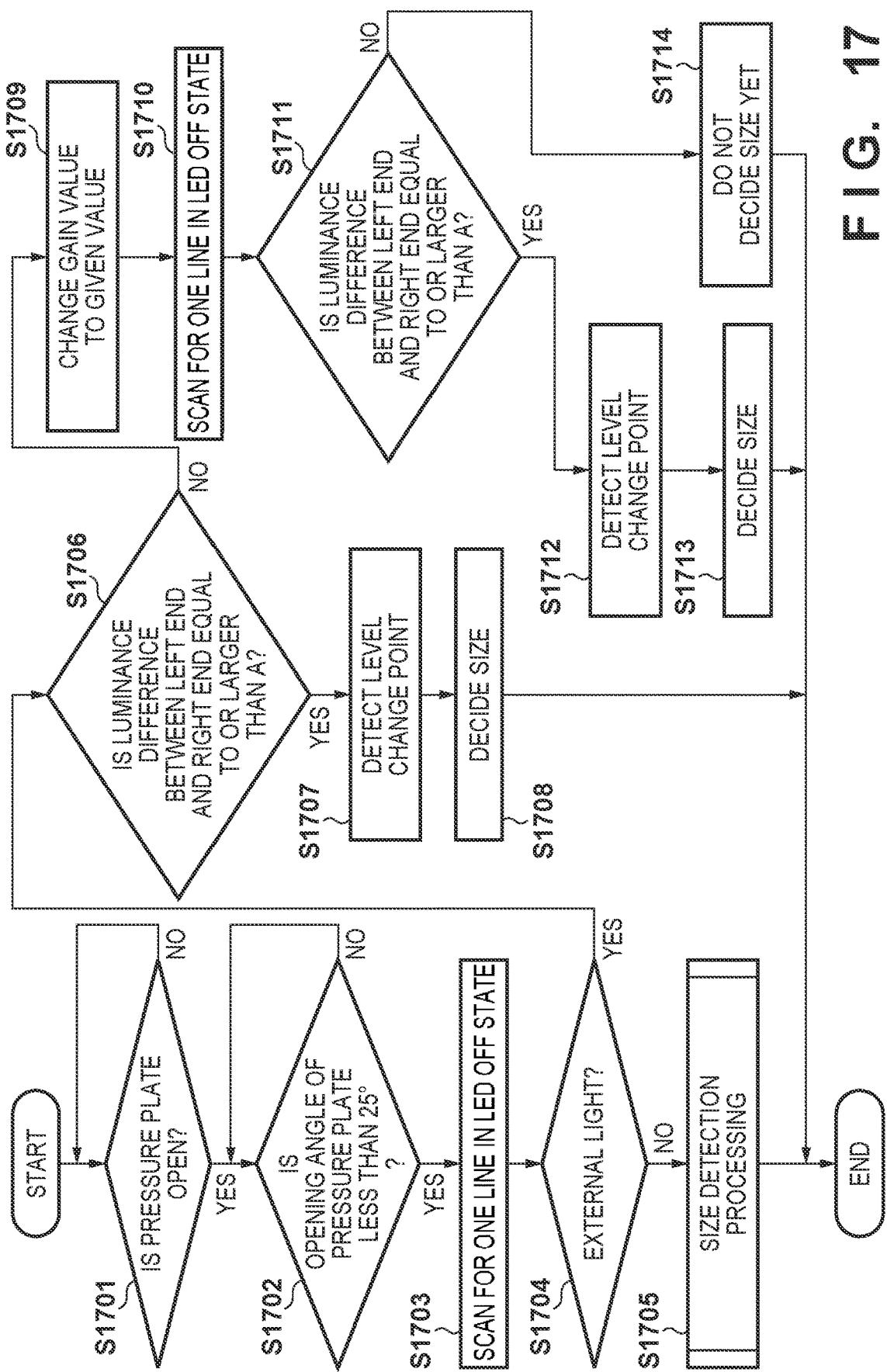
FIG. 17 is a flowchart showing reading control processing.

FIG. 17 is a flowchart showing document size detection processing according to this embodiment. The processing of FIG. 17 is implemented by, for example, causing a CPU 401 to load programs stored in a ROM 403 into a RAM 402 and execute them.

Processes in steps S1701 to S1708 are the same as a description in steps S1401 to S1408 of FIG. 14, and thus a description thereof will be omitted.

If the CPU 401 determines in step S1706 that a difference in luminance value between a left end and a right end out of luminance values in a main scanning direction is equal to or larger than a threshold A, it changes a current gain value to a predetermined value. At this time, the CPU 401 changes the current gain value to a lower gain value as a predetermined luminance value so as to read a document more darkly than reading it by the current gain value. In step S1710, the CPU 401 obtains a luminance value for one entire line in a main scanning direction again with the light source of an image sensor unit 108 being OFF. Then, the process advances to step S1711.

As in step S1706, the CPU 401 determines in step S1711 whether the difference in luminance value between the left end and the right end out of the luminance values in the main scanning direction obtained in step S1703 is equal to or larger than the threshold A. If the CPU 401 determines here that the difference is equal to or larger than the threshold A, it detects the level change point for one line in the main scanning direction in step S1712 as in step S1707. As in step S1708, the CPU 401 decides a document size in the main scanning direction using the detected level change point as the document end in step S1713, and then terminates the processing of FIG. 17. At this time, as in the third embodiment, the CPU 401 may determine the presence/absence of the document instead of deciding the document size. In the processing of FIG. 17, the CPU 401 resets the gain value to read a document image if it changes the gain value before terminating the flowchart of FIG. 17.

On the other hand, if the CPU 401 determines in step S1711 that the difference is not equal to or larger than the threshold A, it determines in step S1714 that the document size is undecided, and then terminates the processing of FIG. 17. At this time, the CPU 401 may display an alarm indicating that the document size cannot be decided on the panel of an operation unit 105. As a message of the alarm, a message may be used which not only indicates that the document size cannot be decided but also prompts a user to reduce the angle of an ADF pressure plate 102 more so as to weaken the influence of the external light. At this time, the message may include an instruction button for executing the processing of FIG. 17 again. Alternatively, a message may be used which prompts the user to do maintenance such as the inspection or exchange of the image sensor unit 108.

As described above, according to this embodiment, the gain value is decreased when the document end cannot be detected, making it possible to detect the document end even under the influence of the strong external light and to decide the document size appropriately. It is also possible to prevent a condition under which a process of changing the gain value does not complete.

Fifth Embodiment

The fifth embodiment will be described below with respect to a difference from the other embodiments.

Figure 18:
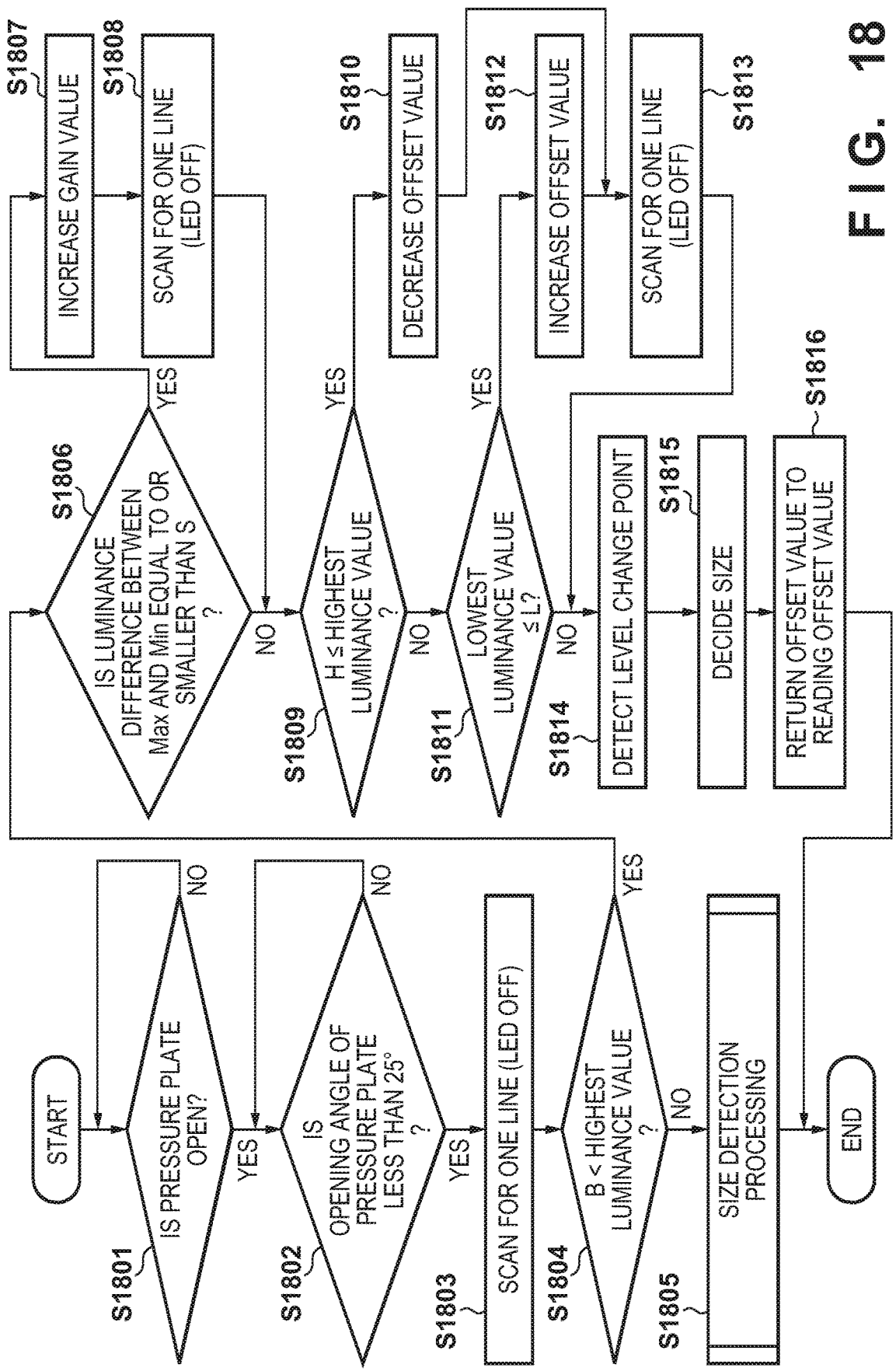
FIG. 18 is a flowchart showing reading control processing.

FIG. 18 is a flowchart showing reading control processing according to this embodiment. The processing of FIG. 18 is implemented by, for example, causing a CPU 401 to load programs stored in a ROM 403 into a RAM 402 and execute them.

In step S1801, the CPU 401 determines whether an ADF pressure plate 102 is open by an opening/closing detection sensor 410 and repeats a process in step S1801 until it determines that the ADF pressure plate 102 is open. A determination in step S1801 may be made based on, for example, a detection that the ADF pressure plate 102 is not closed, that is, open at some angle. After the CPU 401 determines that the ADF pressure plate 102 is open, it determines whether the ADF pressure plate 102 is open at less than 25° and repeats a process in step S1802 until it determines that the ADF pressure plate 102 is open at less than 25°. If the CPU 401 determines that the ADF pressure plate 102 is open at less than 25°, it starts the following size detection processing of a document placed on a document table glass 107.

The document size detection processing in this embodiment is performed by detecting an external light amount by an image reading sensor 407. That is, it uses an increase in luminance at the end of the image reading sensor 407 in a main scanning direction in a case in which the end is exposed to external light without being covered with the document when the document is placed on the document table glass 107.

In step S1803, the CPU 401 obtains luminance values in the main scanning direction in a state in which a light source such as an LED of an image sensor unit 108 is turned off (OFF). At this time, the image sensor unit 108 is positioned at a book reading range start position 107a. In step S1804, the CPU 401 determines whether the maximum luminance value out of the luminance values obtained in the main scanning direction is larger than a predetermined threshold B. If the CPU 401 determines here that the value is larger than the threshold B, it determines that there is the external light, and the process advances to step S1806. If the CPU 401 determines that the value is not larger than the threshold B (equal to or smaller than the threshold B), it determines that there is no external light, and the process advances to step S1805. In step S1805, the CPU 401 executes the first document size detection processing shown in FIG. 15. After the processing in step S1805, the CPU 401 terminates the processing of FIG. 18.

On the other hand, if the CPU 401 determines in step S1804 of FIG. 18 that there is the external light, the following second document size detection processing is executed.

In a case in which a document is placed on the document table glass 107 as shown in FIG. 8, luminance changes as shown in FIG. 16A if the document is scanned in a state in which the light source of the image sensor unit 108 is OFF. In this embodiment, the length of a document in the main scanning direction is specified from a level change point between a document-present region covered with the document and a document-absent region not covered with the document. In this embodiment, luminance values at a plurality of spots in one line in the main scanning direction are obtained from a left end to a right end in FIG. 8 and based on the luminance values at the respective spots, a point where the luminance value changes is detected as a document end.

In step S1806, the CPU 401 determines whether a difference between the maximum luminance value and the minimum luminance value out of the luminance values in the main scanning direction obtained in step S1803 is equal to or smaller than a threshold S. If the CPU 401 determines here that the value is equal to or smaller than the threshold S, the CPU 401 determines that a gap in luminance value between the document-present region and the document-absent region is small as shown in, for example, FIG. 19. To cope with this, in step S1807, the CPU 401 increases a gain value when the image reading sensor 407 outputs a reading signal as correction for increasing a gap between the document-present region and the document-absent region. In step S1808, the CPU 401 obtains the luminance value for one entire line in the main scanning direction again with the light source of the image sensor unit 108 being OFF, and the process advances to step S1809. On the other hand, if the CPU 401 determines in step S1806 that the difference is not equal to or smaller than the threshold S, the process advances to step S1809.

In step S1809, the CPU 401 determines whether the maximum luminance value out of the luminance values in the main scanning direction obtained in step S1803 is equal to or larger than a predetermined threshold H. If the CPU 401 determines here that the value is equal to or larger than the threshold H, in step S1810, the CPU 401 decreases an offset value when the image reading sensor 407 outputs a reading signal as correction for increasing the gap between the document-present region and the document-absent region. Note that if a readable reading value, for example, a luminance value falls within a range of 0 to 255, the threshold H is a value of 255 or a value as close to 255 as possible. The change amount of the offset value is a value when the luminance value decreases by a difference between the minimum luminance value out of the luminance values in the main scanning direction obtained in step S1803 and the readable lowest luminance value of 0. In step S1813, the CPU 401 obtains the luminance value for one entire line in the main scanning direction again with the light source of the image sensor unit 108 being OFF, and the process advances to step S1814.

In this embodiment, under a condition where the external light is strong as the maximum luminance value is equal to or larger than the predetermined threshold H in step S1809, a so-called blown-out highlight state without any variation in light and shade is obtained, making it impossible to specify the document end appropriately. To cope with this, in this embodiment, a method of outputting a reading signal for determining the document end is changed by changing the gain value in step S1807 and reading the document image darkly by decreasing the offset in step S1810. As a result, it becomes easier to identify a gap in luminance value, making it possible to determine the document end appropriately in accordance with an outside condition.

On the other hand, if the CPU 401 determines in step S1809 that the value is not equal to or larger than the threshold H, the process advances to step S1811. In step S1811, the CPU 401 determines whether the minimum luminance value out of the luminance values in the main scanning direction obtained in step S1803 is equal to or smaller than a predetermined threshold L. If the CPU 401 determines here that the value is equal to or smaller than the threshold L, in step S1812, it increases the offset value when the image reading sensor 407 outputs the reading signal as correction for increasing the gap between the document-present region and the document-absent region. Note that if the readable luminance value falls within the range of 0 to 255, the threshold L is a value of 0 or a value as close to 0 as possible. The change amount of the offset value is a value when the luminance value increases by a difference between the maximum luminance value out of the luminance values in the main scanning direction obtained in step S1803 and the readable maximum luminance value of 255. In step S1813, the CPU 401 obtains the luminance value for one entire line in the main scanning direction again with the light source of the image sensor unit 108 being OFF, and the process advances to step S1814.

As described above, in this embodiment, the method of outputting the reading signal for determining the document end is also changed by increasing the offset value if the minimum luminance value is equal to or smaller than the threshold L in step S1811. As a result, it becomes easier to identify the gap in luminance value, making it possible to determine the document end appropriately in accordance with the outside condition.

The CPU 401 detects a level change point for one line in the main scanning direction in step S1814 and decides a document size in the main scanning direction using the detected level change point as the document end in step S1815. At this time, as in the third embodiment, the CPU 401 may determine the presence/absence of the document instead of deciding the document size. After a process in step S1815, the CPU 401 sets the offset value to read the document if it changes the offset value in step S1810 or S1812, and then terminates the processing of FIG. 18. After the processing of FIG. 18, upon detecting that an ADF pressure plate 102 is closed, the CPU 401 reads the document placed on the document table glass 107 by the image sensor unit 108. At this time, the CPU 401 also resets the gain value to read the document image if it changes the gain value in step S1807.

As described above, according to this embodiment, the gain value and the offset value are changed between times when the document image is read and when the document end is determined, making it possible to detect the document end even under the influence of the strong external light and to decide the document size appropriately.

Sixth Embodiment

The sixth embodiment will be described below with respect to a difference from the other embodiments.

FIG. 20 is a flowchart showing document size detection processing according to this embodiment. The processing of FIG. 20 is implemented by, for example, causing a CPU 401 to load programs stored in a ROM 403 into a RAM 402 and execute them.

Processes in steps S2001 to S2013 and steps S2015 to S2017 are the same as a description in steps S1801 to S1813 and steps S1814 to S1816 of FIG. 18, and thus a description thereof will be omitted.

After the process in step S2013, the CPU 401 determines whether a difference between the maximum luminance value and the minimum luminance value out of luminance values in the main scanning direction obtained in step S2003 is equal to or smaller than a threshold S. If the CPU 401 determines here that the difference is equal to or smaller than the threshold S, the CPU 401 repeats the process from step S2009. If the CPU 401 determines that the difference is not equal to or smaller than the threshold S, the process advances to step S2015.

As described above, according to this embodiment, the gain value and the offset value are changed when the document end is determined, and a level change point is detected if the difference between the maximum luminance value and the minimum luminance value is larger than the threshold S, making it possible to perform stable document end detection processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-217444, filed Nov. 7, 2016, and Japanese Patent Application No. 2016-217442, filed Nov. 7, 2016, that are hereby incorporated by reference herein in their entirety.

What is claimed is:

1. A reading apparatus comprising:
   a document table on which a document is placeable;
   a document cover configured to cover the document table;
   an irradiation unit configured to irradiate the document table with light;
   a light-receiving unit configured to receive light on the document table in a state in which the document cover is open and the irradiation unit does not irradiate the document table with the light, and to output an output signal based on a light-reception result;
   a determination unit configured to determine an end of a document placed on the document table based on the output signal; and
   a change unit configured to change the output signal, in a case where the output signal is larger than a predetermined value, and to output a changed output signal;
   wherein, in a case where the change unit changes the output signal, the determination unit determines the end of the document based on the changed output signal.

2. The apparatus according to claim 1, wherein the change unit changes a gain value for changing the output signal to a second gain value different from a first gain value, wherein the first gain value is a gain value when the light-receiving unit outputs the output signal in a state in which the irradiation unit irradiates the document table with the light.

3. The apparatus according to claim 1, wherein the change unit changes an offset value for changing the output signal to a second offset value different from a first offset value, wherein the first offset value is an offset value when the light-receiving unit outputs the output signal in the state in which the irradiation unit irradiates the document table with the light.

4. The apparatus according to claim 1, wherein the determination unit determines the end of the document based on a spot where luminance values each corresponding to the light-reception result become equal to or larger than a threshold.

5. The apparatus according to claim 4, further comprising a calculation unit configured to calculate the threshold based on a maximum value and a minimum value of the luminance values,
wherein the determination unit determines the end of the document based on the threshold calculated by the calculation unit.

6. The apparatus according to claim 1, wherein the determination unit determines the end of the document based on a spot where a change amount in each of a plurality of light-reception results by the light-receiving unit becomes equal to or larger than a threshold.

7. The apparatus according to claim 6, further comprising a calculation unit configured to calculate the threshold based on a maximum luminance value and a minimum luminance value of the light-reception results by the light-receiving unit,
wherein the determination unit determines the end of the document based on the threshold calculated by the calculation unit.

8. The apparatus according to claim 1, further comprising a size detection unit configured to detect a size of the document based on the end of the document determined by the determination unit.

9. The apparatus according to claim 1, further comprising a presence/absence detection unit configured to detect presence/absence of the document on the document table based on the end of the document determined by the determination unit.

10. The apparatus according to claim 1, wherein, in a case where the output signal is equal to or less than the predetermined value in the state in which the document cover is open and the irradiation unit does not irradiate the document table with the light, the determination unit determines the end of the document based on the output signal outputted by the light-receiving unit in a state in which the irradiation unit irradiates the document table with the light.

11. A reading apparatus comprising:
a document table on which a document is placeable;
a document cover configured to cover the document table;
an irradiation unit configured to irradiate the document table with light;
a light-receiving unit configured to receive light on the document table in a state in which the document cover is open and the irradiation unit does not irradiate the document table with the light, and to output a luminance value corresponding to a light-reception result as an output signal;
a determination unit configured to determine an end of a document placed on the document table based on the output signal; and
a change unit configured to change the output signal, in a case where a maximum luminance value of the output signal is larger than a predetermined value, and to output a changed output signal;
wherein, in a case where the change unit changes the output signal, the determination unit determines the end of the document based on the changed output signal.

12. The apparatus according to claim 11, wherein the change unit changes a gain value for changing the output signal to a second gain value different from a first gain value, wherein the first gain value is a gain value when the light-receiving unit outputs the output signal in a state in which the irradiation unit irradiates the document table with the light.

13. The apparatus according to claim 11, wherein the change unit changes an offset value for the light-receiving unit to output the light-reception result to a second offset value different from a first offset value, wherein the first offset value is an offset value when the light-receiving unit outputs the output signal in the state in which the irradiation unit irradiates the document table with the light.

14. The apparatus according to claim 11, wherein, in a case where the output signal is equal to or less than the predetermined value in the state in which the document cover is open and the irradiation unit does not irradiate the document table with the light, the determination unit determines the end of the document based on the output signal outputted by the light-receiving unit in a state in which the irradiation unit irradiates the document table with the light.

15. A determination method performed in a reading apparatus that includes a document cover that covers a document table, a light-receiving unit configured to receive light on the document table and to output an output signal based on a light-reception result, a change unit configured to change the output signal, and an irradiation unit configured to irradiate the document table with light, the method comprising:
obtaining the output signal in a state in which the document cover that covers the document table is open and the irradiation unit does not irradiate the document table with light;
changing the output signal by the change unit, in a case where the output signal is larger than a predetermined value, based on the obtained output signal; and
based on the output signal changed in the changing, determining the end of the document placed on the document table.

16. The method according to claim 15, wherein the changing comprises changing an offset value for changing the output signal.

17. The method according to claim 15, wherein the changing comprises changing a gain value for changing the output signal.

18. A determination method performed in a reading apparatus that includes a document cover that covers a document table, a light-receiving unit configured to receive light on the document table and to output luminance values each corresponding to a light-reception result as an output signal, a change unit configured to change the output signal, and an irradiation unit configured to irradiate the document table with light, the method comprising:
obtaining the luminance values in a state in which the document cover that covers the document table is open and the irradiation unit does not irradiate the document table with light;
changing the output signal by the change unit based on a maximum value of the luminance values obtained in the obtaining; and
based on the output signal changed in the changing, determining the end of the document placed on the document table.

19. The method according to claim 18, wherein the changing comprises changing an offset value for changing the output signal.

20. The method according to claim 18, wherein the changing comprises changing a gain value for changing the output signal.

* * * * *